United States Patent [19]
Saito et al.

[11] Patent Number: 6,008,346
[45] Date of Patent: Dec. 28, 1999

[54] PHTHALOCYANINE COMPOUND AND ELECTROPHOTOGRAPHIC PHOTORECEPTOR COMPRISING SAME

[75] Inventors: Yoshitaka Saito, Saitama; Katsunori Oba, Tochigi; Shinichi Okada, Saitama, all of Japan

[73] Assignee: Dainippon Ink and Chemicals, Inc., Tokyo, Japan

[21] Appl. No.: 09/302,187

[22] Filed: Apr. 30, 1999

Related U.S. Application Data

[62] Division of application No. 08/966,464, Nov. 7, 1997.

[30] Foreign Application Priority Data

Mar. 31, 1997 [JP] Japan .................................. 9-080040

[51] Int. Cl.$^6$ .......................... C07D 487/22; C09B 47/04
[52] U.S. Cl. .......................... 540/139; 540/122; 540/140
[58] Field of Search .................................. 540/122, 139, 540/140

[56] References Cited

U.S. PATENT DOCUMENTS

| | | |
|---|---|---|
| 5,441,837 | 8/1995 | Ong et al. . |
| 5,593,805 | 1/1997 | Go et al. . |

FOREIGN PATENT DOCUMENTS

| | | |
|---|---|---|
| 0 548 809 A1 | 6/1993 | European Pat. Off. . |
| 2-280169 | 11/1990 | Japan . |
| 5-241361 | 9/1993 | Japan . |
| 5-273776 | 10/1993 | Japan . |
| 8-302223 | 11/1996 | Japan . |

OTHER PUBLICATIONS

Chem. Abst: 112:47557., 1990., Marchon et al,.

*Primary Examiner*—Mukund J. Shah
*Assistant Examiner*—Pavanaram K Sripada
*Attorney, Agent, or Firm*—Armstrong, Westerman, Hattori, McLeland & Naughton

[57] ABSTRACT

The present invention provides an electrophotographic photoreceptor which can be prepared so easily as to exhibit a photosensitivity well-adjusted for the respective type of machine in the dip coating method, which is an ordinary method for the preparation of an electrophotographic photoreceptor. A novel electrophotographic photoreceptor is provided comprising a charge-transporting layer and a charge-generating layer provided on an electrically-conductive support, wherein the charge-generating layer is a layer comprising a charge-generating material containing a phthalocyanine compound represented by the following general formula (1) dispersed in a resin:

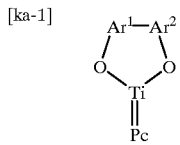

(1)

wherein $Ar^1$ and $Ar^2$ each independently represent an ortho-phenylene group which may have a substituent; and Pc represents an unsubstituted or substituted phthalocyanine residue.

5 Claims, 17 Drawing Sheets

PHTHALOCYANINE COMPOUND AND ELECTROPHOTOGRAPHIC PHOTORECEPTOR COMPRISING SAME

This application is a division of Ser. No. 08/966,464 filed Nov. 7, 1997.

FIELD OF THE INVENTION

The present invention relates to an electrophotographic photoreceptor to be incorporated in duplicating machine, LD printer, LED printer, etc. and a novel phthalocyanine compound.

BACKGROUND OF THE INVENTION

An electrophotographic photoreceptor normally comprises a photosensitive layer provided on an electrically-conductive support. Examples of the photosensitive layer structure include single-layer type photosensitive layer and laminated type photosensitive layer comprising a plurality of functionally separated layers, i.e., charge-generating layer and charge-transporting layer.

An electrophotographic photoreceptor is normally expected to meet all the following requirements for properties:

(1) To be capable of being charged to a proper potential in the dark place;
(2) To be sufficiently capable of retaining electric charge in the dark place;
(3) To be photosensitive enough to release electric charge rapidly and sufficiently when irradiated with light;
(4) To be capable of forming an electrophotographic photoreceptor having a proper area;
(5) To have an excellent repetition stability;
(6) To have an excellent durability;
(7) To be inexpensive; and
(8) To be harmless to human being.

An electrophotographic photoreceptor comprising an organic photoconductor (OPC) is normally of the laminated type, because such photoreceptor can easily be functionally controlled to meet the foregoing requirements.

The function of a charge-generating layer is to generate electric charge when irradiated with light in an electric field. A charge-generating layer normally comprises a charge-generating material dispersed in a binder resin. It is an important layer which determines the photosensitivity of an electrophotographic photoreceptor.

The photosensitivity of an electrophotographic photoreceptor depends on the efficiency at which the charge-generating material absorbs light to generate electric charge (efficiency of generating electric charge) and the amount of the charge-generating material.

In recent years, various printers and duplicating machines using such electrophotographic system have been marketed. Thus, it has been desired that various properties, particularly the photosensitivity of the electrophotographic photoreceptor be optimized to meet the requirements for various types of machines.

Accordingly, it is necessary that the photosensitivity of the electrophotographic photoreceptor be adjusted for every type of machine to meet these requirements.

In order to adjust the photosensitivity of the electrophotographic photoreceptor, it is necessary that a charge-generating layer which shows a proper photosensitivity corresponding to the type of machine in which it is used be formed on an electrically-conductive support.

One of methods for adjusting the photosensitivity of the electrophotographic photoreceptor is to adjust the thickness of the charge-generating layer.

In the case where the dip coating method, which is an ordinary process for the preparation of an electrophotographic photoreceptor, is used, if the thickness of the charge-generating layer is reduced in an attempt to adjust the photosensitivity of the electrophotographic photoreceptor, the thickness of the resulting electrophotographic photoreceptor is drastically uneven, adding to the dispersion of the photosensitivity of the electrophotographic photoreceptor.

Another method for adjusting the photosensitivity of the electrophotographic photoreceptor is to use a plurality of materials having different efficiencies of charge generation as charge-generating materials to be incorporated in the charge-generating layer.

The foregoing technique involving the use of a plurality of materials have heretofore been extensively studied. Examples of the technique for adjusting the photosensitivity of the electrophotographic photoreceptor with a plurality of materials will be given below. (1) JP-A-2-280169 (The term "JP-A" as used herein means an "unexamined published Japanese patent application") discloses that the use of a mixture of (1) a phthalocyanine selected from the group consisting of copper phthalocyanine, aluminum phthalocyanine, indium phthalocyanine and vanadium phthalocyanine, (2) titanyl phthalocyanine and optionally (3) a phthalocyanine selected from the group consisting of aluminum phthalocyanine and metal-free phthalocyanine as a charge-generating material makes it possible to obtain a functionally-separated electrophotographic photoreceptor which can be adjusted for photosensitivity.

In Example 1 of the above cited patent, a metal-free phthalocyanine ($H_2Pc$) and aluminum phthalocyanine (AlClPc) were used. Dispersions comprising the metal-free phthalocyanine in an amount of 0, 20, 40, 60, 80 and 100% by weight based on the total 10 parts of the phthalocyanine compounds were used to form charge-generating layers. It is disclosed that the photosensitivity of the electrophotographic photoreceptor can be adjusted with the half-decay exposure $E_{50}$ varying within a range of from 4 to 6 erg/cm² while the proportion of the metal-free phthalocyanine is within a range of from 0 to 40% by weight.

In Example 2 of the above cited patent, indium phthalocyanine (InClPc) was used in an amount of 0, 20, 40, 60, 80 and 100% by weight based on the total weight of indium phthalocyanine and titanyl phthalocyanine (TiOPc). These combinations were each vacuum-deposited onto a support under a pressure of $2 \times 10^{-6}$ torr. The deposited support was then dipped in ethanol. Another batch of the deposited support was not treated. Thus, a charge-generating layer was formed. It is disclosed that the photosensitivity of the electrophotographic photoreceptor can be adjusted with the half-decay exposure $E_{50}$ varying within a range of from 2 to 6 erg/cm² (treated with ethanol) or from 4 to 6 erg/cm² (untreated) while the proportion of indium phthalocyanine is within a range of from 0 to 40% by weight.

In Example 3 of the above cited patent, copper phthalocyanine (CuPc) and titanyl phthalocyanine were used. Copper phthalocyanine was used in an amount of 0, 20, 40, 60, 80 and 100% by weight based on the total weight of these phthalocyanines. These combinations were each vacuum-deposited onto a support under a pressure of $2 \times 10^{-6}$ torr to form a charge-generating layer. It is disclosed that the photosensitivity of the electrophotographic photoreceptor can be adjusted with the half-decay exposure $E_{50}$ varying within a range of from 4 to 8 erg/cm² while the proportion of copper phthalocyanine is within a range of from 0 to 40% by weight. (2) JP-A-5-241361 (which corresponds to EP548809 A1) discloses that the provision of a photosensitive layer comprising oxytitanium phthalocyanine and dihalogenotin phthalocyanine makes it possible to adjust the photosensitivity of the electrophotographic photoreceptor.

The above cited patent discloses in its examples that the use of a dispersion comprising oxytitanium phthalocyanine and dichlorotin phthalocyanine at a weight ratio of from 10:90 to 80:20 makes it possible to adjust the photosensitivity of the electrophotographic photoreceptor with the half-decay exposure $E_{1/2}$ varying within a range of from 0.16 to 0.36 lux·sec. as measured by an electrostatic paper analyzer.

In the dip coating method, which is an ordinary process for the preparation of an electrophotographic photoreceptor, however, the range of adjustment of photosensitivity made by the dispersion comprising a metal-free phthalocyanine and aluminum phthalocyanine is 1.5 times as shown in Example 1 of the above cited patent (1). Similarly, the range of adjustment of photosensitivity made by the dispersion of the above cited patent (2) is twice.

SUMMARY OF THE INVENTION

It is therefore an object of the present invention to provide an electrophotographic photoreceptor which can be prepared so easily as to exhibit a photosensitivity well-adjusted for the respective type of machine in the dip coating method, which is an ordinary method for the preparation of an electrophotographic photoreceptor.

The foregoing object of the present invention will become more apparent from the following detailed description and examples.

The inventors made extensive studies of solution to the foregoing problems. As a result, it was found that an aromatic compound having a specific structure and an oxytitanium phthalocyanine compound give a reaction product and the combined use of a phthalocyanine compound which is such a reaction product and a titanium phthalocyanine compound as charge-generating materials in the dip coating method makes it possible to adjust the photosensitivity of an electrophotographic photoreceptor within a wide range.

It was also found that even the single use of the foregoing phthalocyanine compound as a charge-generating material makes it possible to obtain a practical electrophotographic photoreceptor. It was further found that the foregoing phthalocyanine compound is a novel compound.

A phthalocyanine compound has long been known as a pigment. In recent years, it has been noted as a material sensitive to near infrared rays in the long wavelength range with the development of electronic industry.

The preprint of "Japan Hardcopy '92", pp. 153–156, 1992's Annual Symposium of The Society of Electrophotography of Japan gives a main purport of a lecture titled "Production and Characteristics of Titanyl Phthalocyanine Crystal Containing Diol Compound". The preprint of "Japan Hardcopy '93", pp. 659–662, 1993's International Symposium of The Society of Electrophotography of Japan gives a main purport of a lecture titled "Syntheses and Properties of Titanyl Phthalocyanine; New Polymorphs". JP-A-5-273776 describes that an aromatic group-neighboring diol compound such as 3-methylcatechol and oxytitanium phthalocyanine together produce an adduct. These references suggest that such an adduct can be used in electrophotographic photoreceptor, etc.

However, an electrophotographic photoreceptor comprising an adduct of the foregoing aromatic compound having a substituted or unsubstituted adjacent hydroxyl group (i.e., catechols) with oxytitanium phthalocyanine is still insufficient in photosensitivity. Such an electrophotographic photoreceptor is particularly disadvantageous in that it has a poor chargeability.

The inventors found that an aromatic compound having a specific structure and an oxytitanium phthalocyanine compound together give a novel reaction product which exhibits a new absorption in a longer wavelength range than conventional analogous compounds and thus can cope with near infrared rays more thoroughly than the conventional analogous compounds. Accordingly, it was found that an electrophotographic photoreceptor comprising the foregoing reaction product is excellent in photosensitivity, particularly in chargeability. Thus, the present invention has been worked out.

The present invention provides an electrophotographic photoreceptor comprising a charge-transporting layer and a charge-generating layer provided on an electrically-conductive support, wherein said charge-generating layer is a layer comprising a charge-generating material containing a phthalocyanine compound represented by the following general formula (1) dispersed in a resin:

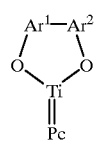

(1)

wherein $Ar^1$ and $Ar^2$ each independently represent an ortho-phenylene group which may have a substituent; and Pc represents an unsubstituted or substituted phthalocyanine residue. The present invention also provides an electrophotographic photoreceptor comprising a charge-transporting layer and a charge-generating layer provided on an electrically-conductive support, wherein said charge-generating layer is a layer comprising a charge-generating material containing the foregoing phthalocyanine compound and a titanium phthalocyanine compound other than the foregoing phthalocyanine compound dispersed in a resin.

The present invention further provides an electrophotographic photoreceptor comprising a charge-transporting layer and a charge-generating layer provided on an electrically-conductive support, wherein said charge-generating layer is a dispersion type of a charge-generating material containing a phthalocyanine compound as a product of the reaction of a bis(hydroxyaryl) compound represented by the following general formula (2) with an oxytitanium phthalocyanine compound, the charge-generating material being dispersed in a resin:

HO—$Ar^1$—$Ar^2$—OH (2)

wherein $Ar^1$ and $Ar^2$ each independently represent an ortho-phenylene group which may have a substituent. The present invention further provides an electrophotographic photoreceptor comprising a charge-transporting layer and a charge-generating layer provided on an electrically-conductive support, wherein said charge-generating layer is a dispersion type of a charge-generating material containing the foregoing phthalocyanine compound and a titanium phthalocyanine compound other than the foregoing phthalocyanine compound, the charge-generating material being dispersed in a resin.

The present invention further provides the foregoing phthalocyanine compounds.

BRIEF DESCRIPTION OF THE DRAWINGS

By way of example and to make the description more clear, reference is made to the accompanying drawings in which.

DETAILED DESCRIPTION OF THE INVENTION

Figure 1:
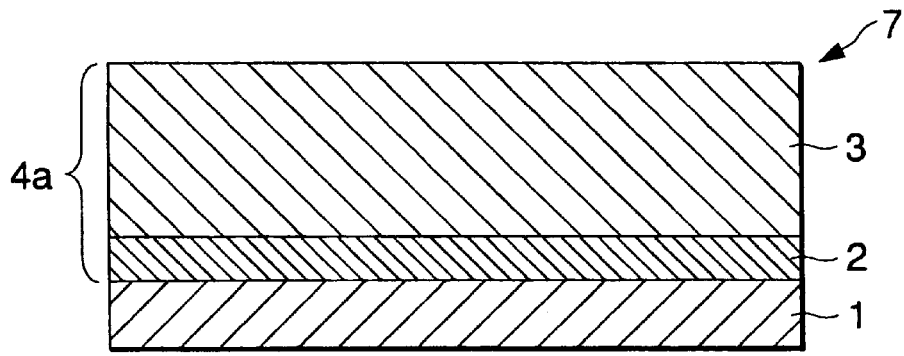
FIG. 1 is a sectional view illustrating an example of the layer structure of the electrophotographic photoreceptor according to the present invention.

The present invention will be further described hereinafter with reference to the electrophotographic photoreceptor comprising in combination a phthalocyanine compound of the present invention and a titanium phthalocyanine compound other than the phthalocyanine compound, the electrophotographic photoreceptor comprising the foregoing phthalocyanine compound, and the foregoing phthalocyanine compound.

The electrophotographic photoreceptor according to the present invention comprises a charge-transporting layer and a charge-generating layer provided on an electrically-conductive support, wherein said charge-generating layer is a dispersion type of a phthalocyanine compound having a cyclic bisarylatotitanium represented by the following general formula (3) bonded to two central nitrogen atoms in phthalocyanine residue, the phthalocyanine compound being dispersed in a resin:

(3)

wherein $Ar^1$ and $Ar^2$ each independently represent an orthophenylene group which may have a substituent. The charge-generating layer is also a dispersion type of the foregoing phthalocyanine compound and a titanium phthalocyanine compound other than the foregoing phthalocyanine compound dispersed in a resin.

The aromatic ring groups $Ar^1$ and $Ar^2$ in the foregoing cyclic bisarylatotitanium each independently represent an orthophenylene group which may have a substituent. Examples of the substituent include a halogen atom such as chlorine and bromine, and various functional groups such as an alkyl group (e.g., methyl, ethyl, t-butyl), an alkoxy group (e.g., methoxy, ethoxy), an unsubstituted or substituted aryl group (e.g., phenyl, naphthyl), an unsubstituted or substituted heterocyclic group (e.g., pyridyl), an unsubstituted or substituted amino group and an unsubstituted or substituted thiol group. The number of substituents which can be introduced and the substitution site can be selected as arbitrarily as possible.

The foregoing phthalocyanine residue is represented by the following general formula (4):

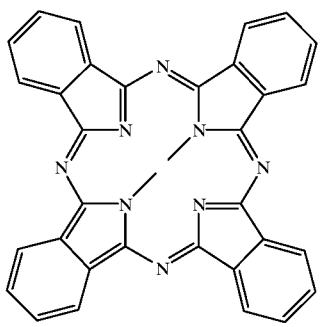
(4)

In the case of the phthalocyanine compound to be incorporated in the electrophotographic photoreceptor according to the present invention, hydrogen atoms in the benzene rings in the phthalocyanine may be unsubstituted or substituted by substituents. Examples of these substituents include a halogen atom such as chlorine and bromine, an alkyl group such as methyl group and ethyl group, and an alkoxy group such as methoxy group and ethoxy group. Alternatively, the phthalocyanine compound according to the present invention may be a cyclically-expanded phthalocyanine derivative such as naphthalocyanine compound.

Specific examples of the phthalocyanine compound having a specific structure to be incorporated in the electrophotographic photoreceptor according to the present invention will be given below.

In the following general formulae, Me, Et, n-Pr, iso-Pr, t-Bu, Ph, Tol, and Pc represent methyl group, ethyl group, straight-chain propyl group, isopropyl group, tertiary butyl group, phenyl group, tolyl group, and substituted or unsubstituted phthalocyanine residue, respectively.

The figures in parentheses each represent the exemplification number of phthalocyanine compound to be incorporated in the electrophotographic photoreceptor of the present invention, but the phthalocyanine compound of the present invention is not limited thereto.

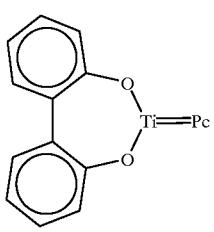
(1)

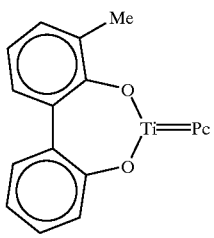
(2)

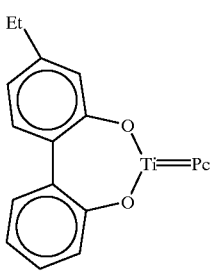
(3)

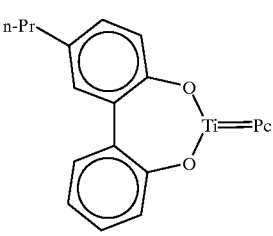
(4)

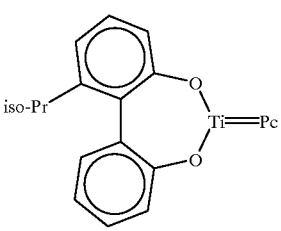
(5)

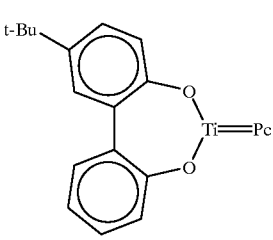
(6)

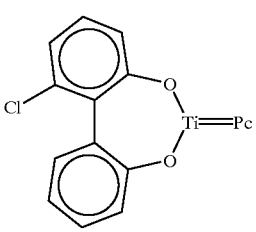
(7)

(8)
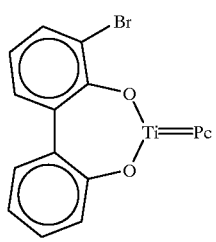
(9)
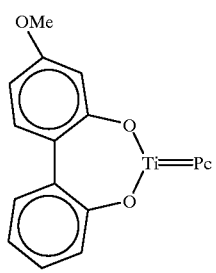
(10)
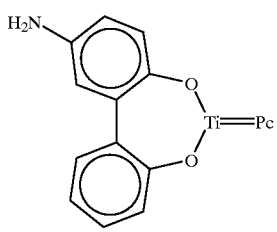
(11)
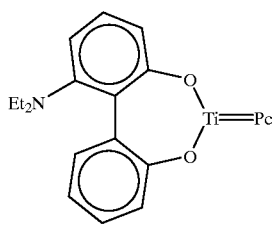
(12)
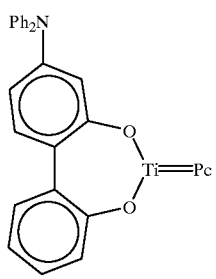
(13)
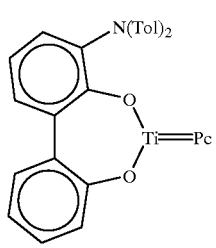
(14)
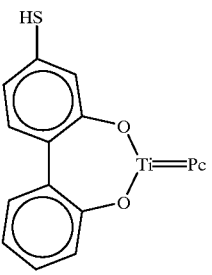
(15)
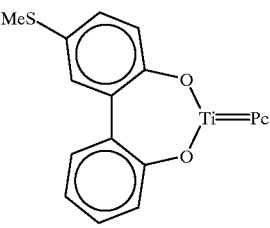
(16)
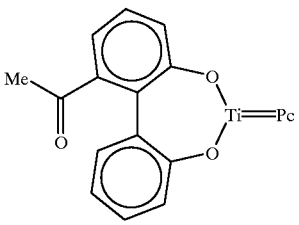
(17)
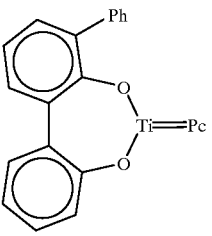
(18)
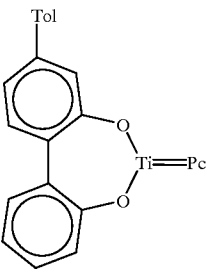
(19)
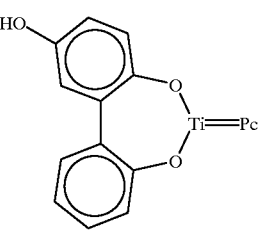

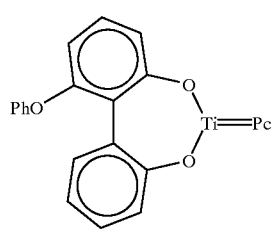
(20)
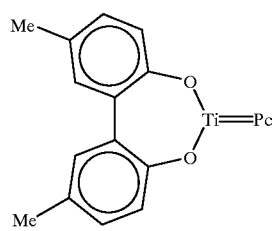
(21)
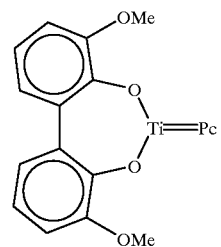
(22)
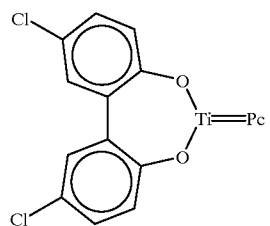
(23)
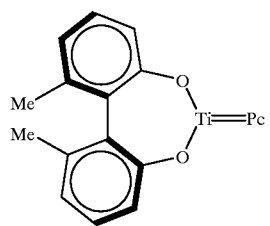
(24)
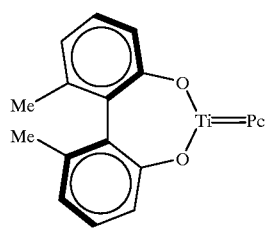
(25)
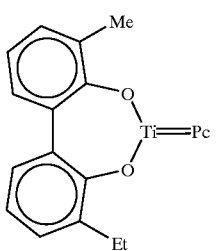
(26)
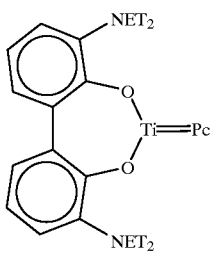
(27)
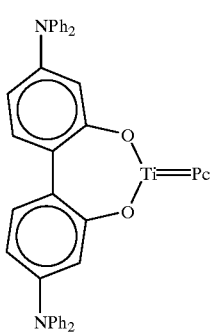
(28)
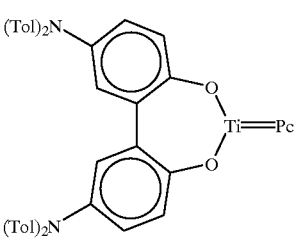
(29)
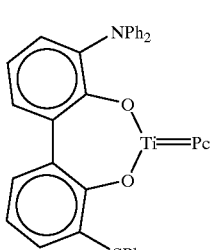
(30)
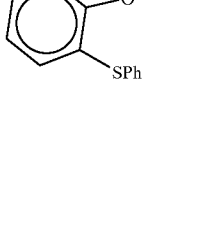

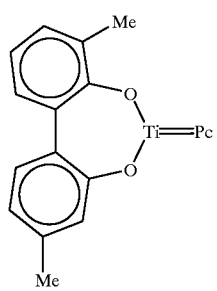
(31)
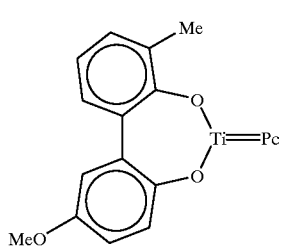
(32)
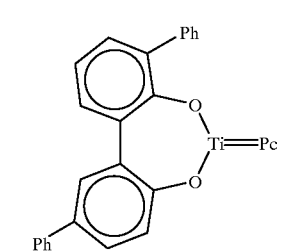
(33)
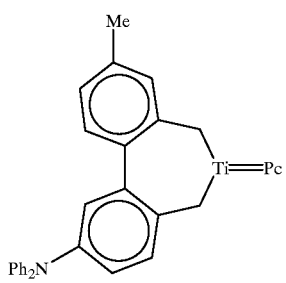
(34)
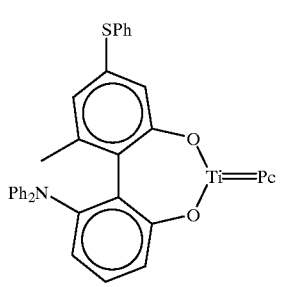
(35)
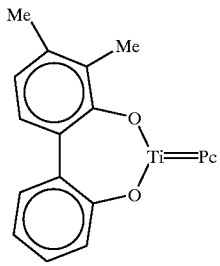
(36)
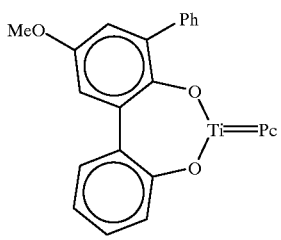
(37)
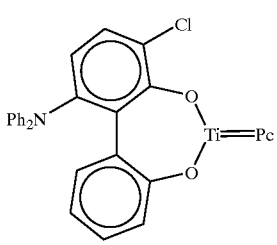
(38)
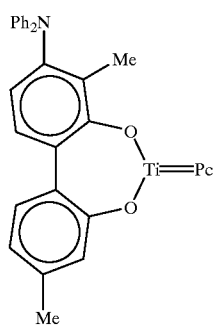
(39)
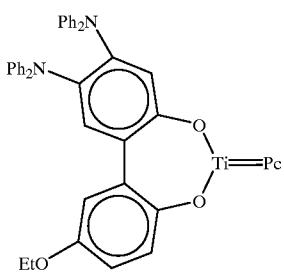
(40)

(41) 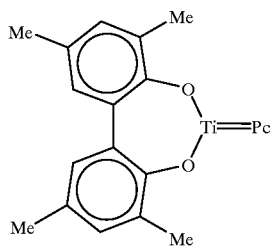

(42) 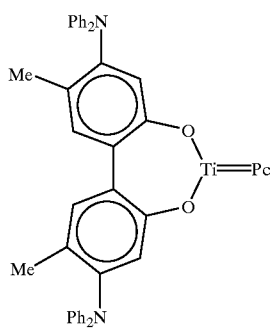

(43) 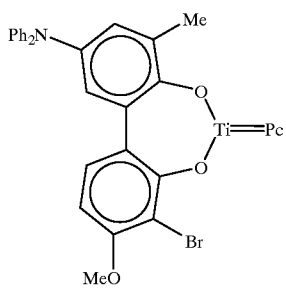

(44) 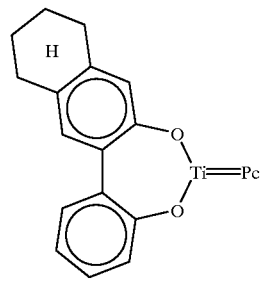

(45) 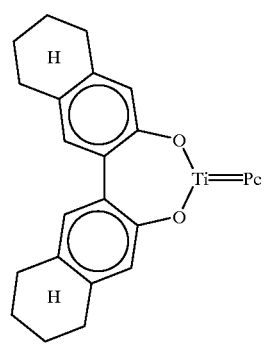

(46) 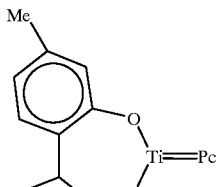

(47) 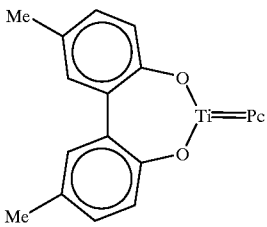

As the bis(hydroxyaryl) compound which can be preferably used in the reaction with the oxytitanium phthalocyanine compound to obtain the phthalocyanine compound to be incorporated in the electrophotographic photoreceptor of the present invention there may be used any bis (hydroxyaryl) compound having two aromatic ring groups containing one or more hydroxyl groups bonded to each other. The bis(hydroxylaryl) compound is represented by, e.g., the following general formula (2):

$$HO-Ar^1-Ar^2-OH \qquad (2)$$

wherein $Ar^1$ and $Ar^2$ each independently represent an ortho-phenylene group which may have a substituent.

The aromatic ring group $Ar^1$ and $Ar^2$ in the foregoing general formula (2) each independently represent an ortho-phenylene group which may have a substituent. Examples of the substituent include a halogen atom such as chlorine and bromine, and various functional groups such as an alkyl group (e.g., methyl, ethyl, t-butyl), an alkoxy group (e.g., methoxy, ethoxy), an unsubstituted or substituted aryl group (e.g., phenyl, naphthyl), an unsubstituted or substituted heterocyclic group (e.g., pyridyl), an unsubstituted or substituted amino group and an unsubstituted or substituted thiol group. The number of substituents which can be introduced and the substitution site can be selected as arbitrarily as possible.

Specific examples of the structural formula of the bis (hydroxylaryl) compound will be given below.

In the following structural formulae, Me, Et, n-Pr, iso-Pr, t-Bu, Ph, and Tol represent methyl group, ethyl group, straight-chain propyl group, isopropyl group, tertiary butyl group, phenyl group, and tolyl group, respectively.

The figure in parentheses each represent the exemplification number of bis(hydroxyaryl) compound which can preferably be used in the reaction with the oxytitanium phthalocyanine compound to obtain the phthalocyanine compound to be incorporated in the electrophotographic photoreceptor of the present invention.

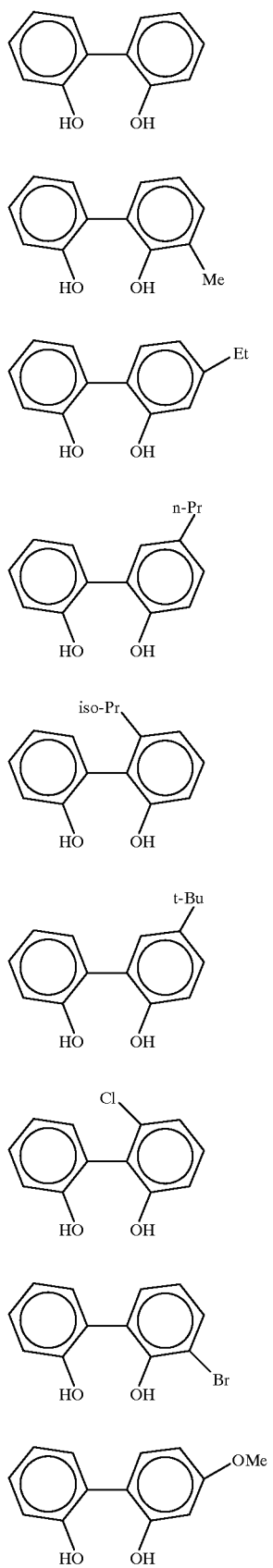
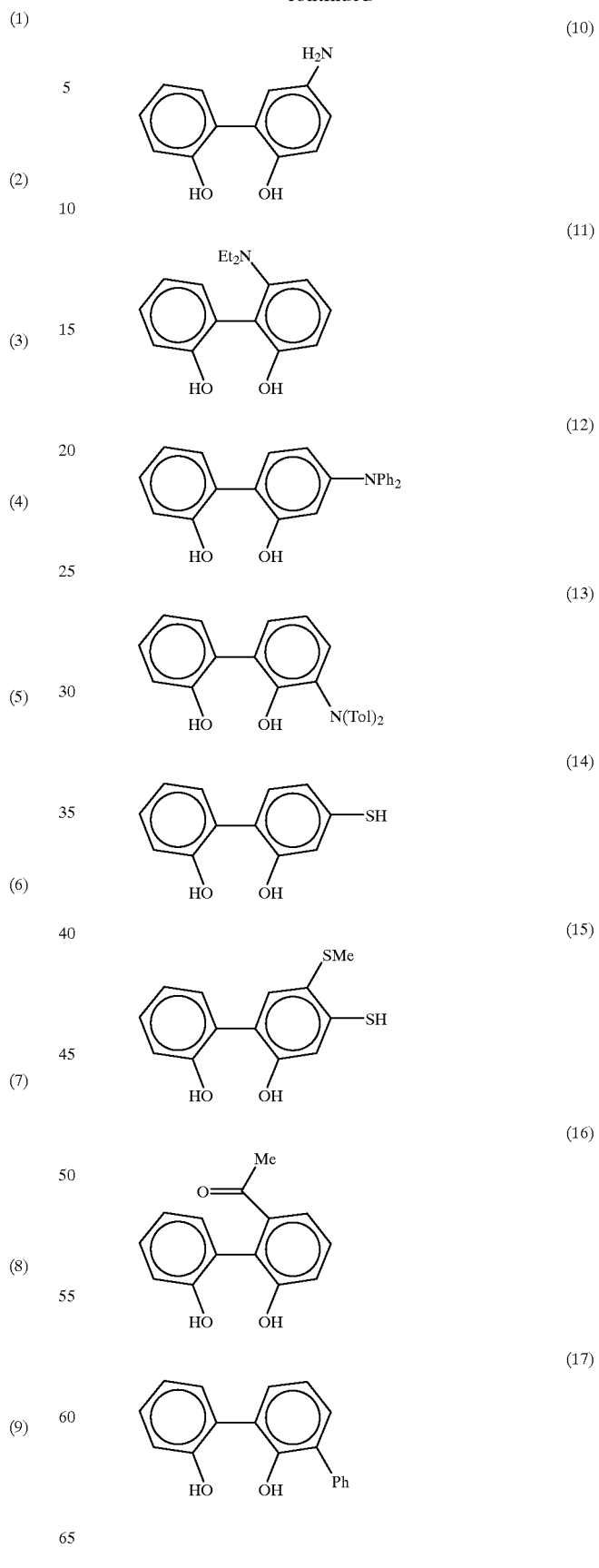

(18) 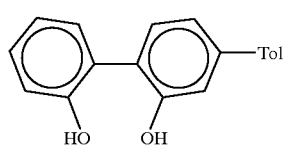
(19) 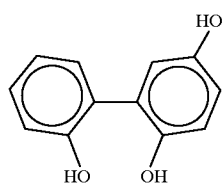
(20) 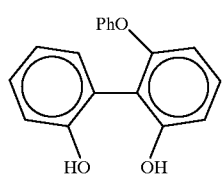
(21) 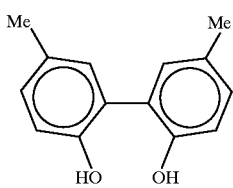
(22) 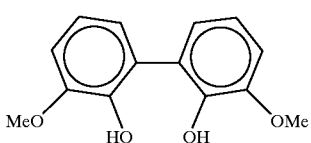
(23) 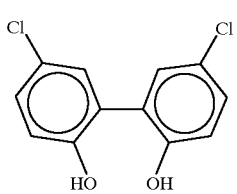
(24) 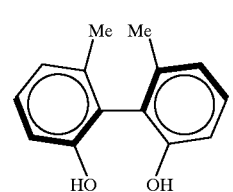
(25) 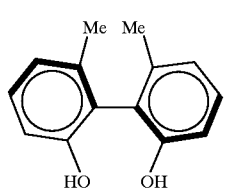
(26) 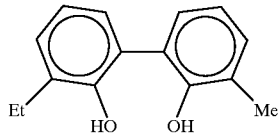
(27) 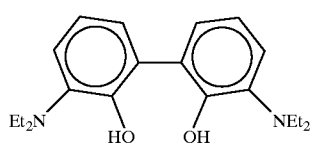
(28) 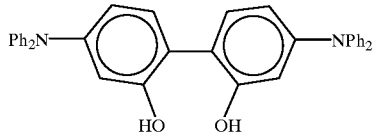
(29) 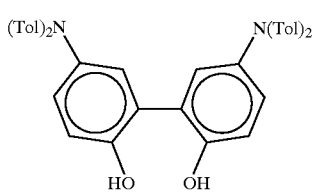
(30) 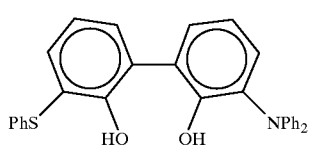
(31) 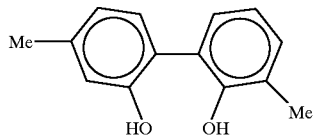
(32) 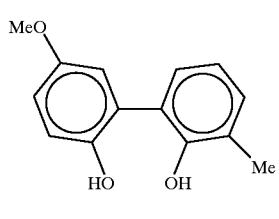
(33) 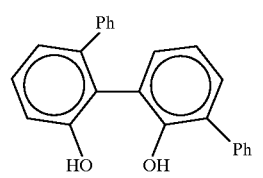
(34) 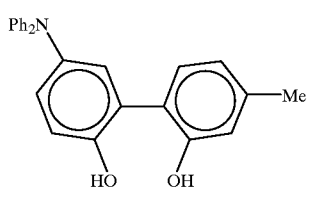

-continued

(35) 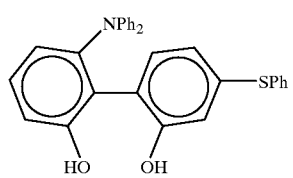

(36) 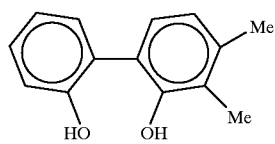

(37) 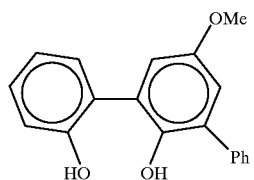

(38) 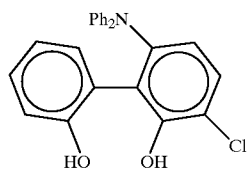

(39) 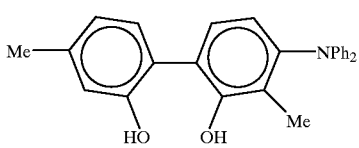

(40) 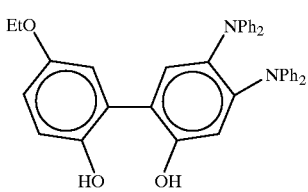

(41) 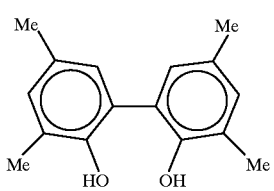

(42) 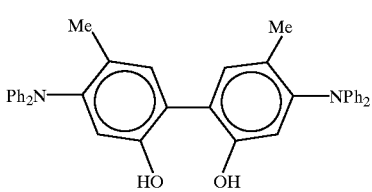

(43) 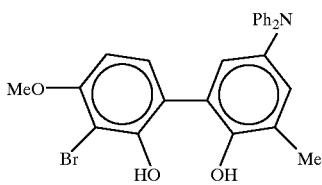

(44) 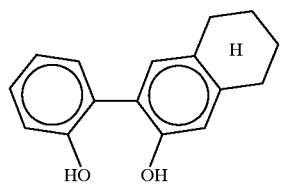

(45) 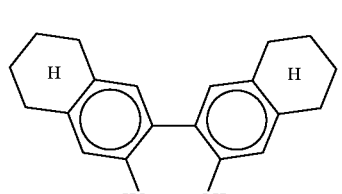

(46) 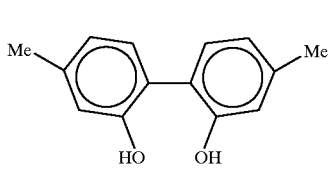

(47) 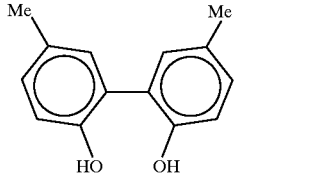

The bis(hydroxyaryl) compound which can preferably be used in the reaction with the oxytitanium phthalocyanine compound to obtain the phthalocyanine compound to be incorporated in the electrophotographic photoreceptor of the present invention is not limited to these exemplary compounds. These exemplary compounds may be used singly or in combination.

The electrophotographic photoreceptor of the present invention can comprise in combination a phthalocyanine compound having the foregoing specific structure and a titanium phthalocyanine compound other than the phthalocyanine compound having the foregoing specific structure to control its photosensitivity within a wide range. Accordingly, an electrophotographic photoreceptor having a proper photosensitivity suitable for the respective type of machine can be obtained.

In particular, the proportion of the phthalocyanine compound having the foregoing specific structure to the titanium phthalocyanine compound other than the phthalocyanine compound having the foregoing specific structure is preferably from 5:95 to 80:20 by weight.

Examples of the foregoing titanium phthalocyanine compound include crystalline oxytitanium phthalocyanine compound such as α type, β type, α-β mixed type, γ type and Y type oxytitanium phthalocyanine compounds and amorphous oxytitanium phthalocyanine compound, titanium phthalocyanine compound such as (2R,3R)-2,3-butyleneglycolatotitanium phthalocyanine, (2S,3S)-2,3-butyleneglycolatotitanium phthalocyanine, (2R,3R)-1,4-bis(benzyloxy)2,3-butyleneglycolatotitanium phthalocyanine and (2S,3S)-1,4-bis(benzyloxy)-2,3-butyleneglycolatotitanium phthalocyanine, titanium phthalocyanine compound as mixed crystal of (2R,3R)-2,3-butyleneglycolatortitanium phthalocyanine and oxytitanium phthalocyanine, and titanium phthalocyanine compound as mixed crystal of butyleneglycolatortitanium phthalocyanine such as (2S,3S)-2,3-butyleneglycolatotitanium phthalocyanine and oxytitanium phthalocyanine. Particularly preferred among these titanium phthalocyanine compounds are oxytitanium phthalocyanine, and titanium phthalocyanine compound as mixed crystal of (2R,3R)-2,3-butyleneglycolatortitanium phthalocyanine and oxytitanium phthalocyanine.

Of course, the foregoing charge-generating materials may be used in combination with other charge-generating materials. Examples of the other charge-generating materials include metal-free phthalocyanine compounds, metal phthalocyanine compounds, azo pigments, anthraquinone pigments, perylene pigments, polycyclic quinone pigments, and squarylium pigments.

The charge-generating layer in the electrophotographic photoreceptor of the present invention may comprise the foregoing phthalocyanine compound having a specific structure, the foregoing titanium phthalocyanine compound other than the phthalocyanine compound having a specific structure, and charge-generating materials other than the two phthalocyanine compounds incorporated therein in combination so far as it doesn't deviate from the objects of the present invention.

Of course, the foregoing phthalocyanine compound having a specific structure may be used singly. Alternatively, two or more such phthalocyanine compounds may be used in admixture.

As the oxytitanium phthalocyanine compound which can be preferably used to obtain the phthalocyanine compound to be incorporated in the electrophotographic photoreceptor of the present invention there may be used any one having oxytitanium in the center of substituted or unsubstituted phthalocyanine residue so far as the effect of the present invention is not impaired. Further, the oxytitanium phthalocyanine compound may be in any crystal form so far as the effect of the present invention is not impaired. Examples of such a crystal form include α type, β type, α-β mixed type, γ type, Y type and amorphous substituted or unsubstituted oxytitanium phthalocyanine compounds. The oxytitanium phthalocyanine compound may also be in the form of a cyclically-expanded oxytitanium phthalocyanine derivative such as oxytitanium naphthalocyanine compound. These oxytitanium phthalocyanine compounds may be used singly or in combination.

The process for the preparation of the foregoing exemplified phthalocyanine compound having a specific structure to be incorporated in the electrophotographic photoreceptor of the present invention is not specifically limited. The foregoing phthalocyanine compound can be prepared by, e.g., the reaction of an oxytitanium phthalocyanine compound with the foregoing exemplified bis(hydroxyaryl) compound having a specific structure.

The conditions under which the foregoing exemplified phthalocyanine compound having a specific structure to be used in the present invention is prepared, e.g., reaction equivalent ratio, reaction temperature, reaction time, solvent, catalyst, purification process, crystallization process may be properly selected.

Referring to reaction equivalent ratio, the foregoing exemplified bis(hydroxyaryl) compound having a specific structure may be used in an amount of from 0.3 to 50 molar equivalents per mol of oxytitanium phthalocyanine compound.

The reaction of oxytitanium phthalocyanine with bis(hydroxyaryl) compound for the production of the phthalocyanine compound to be incorporated in the electrophotographic photoreceptor of the present invention is preferably effected under heating. The reaction temperature is preferably from 30° C. to 300° C., more preferably from 50° C. to 250° C.

Of course, other preparation processes than mentioned above may be used. Examples of these preparation processes include coupling reaction involving the dehydrohalogenation of a dihalotitanium phthalocyanine compound such as dichlorotitanium phthalocyanine with the foregoing exemplified bis(hydroxyaryl) compound having a specific structure, coupling reaction of a titanium salt such as titanium tetrachloride with an orthophthalodinitrile derivative in the presence of a bis(hydroxyaryl) compound and coupling reaction of a tetraalkoxytitanium such as tetra-n-butoxytitanium with a 1,3-diiminoisoindoline derivative in the presence of a bis(hydroxyaryl) compound.

The reaction may be optionally effected with various conventional organic solvents. Examples of these solvents include aromatic organic solvents such as benzene, nitrobenzene, dichlorobenzene, trichlorobenzene and α-chloronaphthalene, ketone-based organic solvents such as cyclohexanone, methyl ethyl ketone and methyl isobutyl ketone, ether-based organic solvents such as tetrahydrofuran and dimethyl cellosolve, ester-based organic solvents such as ethyl butanoate and butyl lactate, aprotic polar organic solvents such as dimethylformamide and dimethyl sulfoxide, halogen-based organic solvents such as trichloroethane, and monovalent alcohol-based organic solvents such as amyl alcohol and dodecanol. These solvents may be used singly or in combination.

Of course, the process for the preparation of the phthalocyanine compound to be incorporated in the electrophotographic photoreceptor of the present invention may optionally involve purification. The purification may be accomplished by sublimation or the like.

The foregoing exemplified phthalocyanine compound having a specific structure to be incorporated in the electrophotographic photoreceptor of the present invention is further characterized by specific infrared absorption in the range of from 580 to 650 $cm^{-1}$ in infrared absorption (IR) spectrum.

The foregoing exemplified phthalocyanine compound having a specific structure to be incorporated in the electrophotographic photoreceptor of the present invention is also characterized by specific light absorption in light absorption spectrum. The electrophotographic photoreceptor of the present invention is mainly characterized by the use of the foregoing phthalocyanine compound having a specific structure.

The charge-transporting material to be incorporated in the electrophotographic photoreceptor of the present invention is not specifically limited. Various charge-transporting materials may be used herein. Examples of these charge-transporting materials include arylamine-based compounds, hydrazone-based compounds, pyrazoline-based compounds, oxazole-based compounds, oxadiazole-based compounds, stilbene-based compounds, butadiene-based compounds, thiazole-based compounds, carbazole-based compounds, diphenoquinone-based compounds, arylmethane-based compounds, and polymerizable compounds such as poly-N-vinylcarbazole, polysilane and polyphosphazene.

The structure of specific representative compounds which can be used as charge-transporting materials herein will be given below. The figure in parentheses under the various structural formulae indicates the exemplification number of the compound.

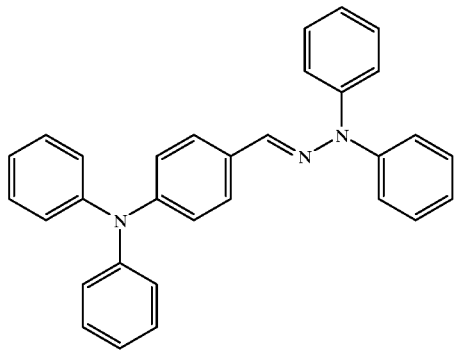

(1)

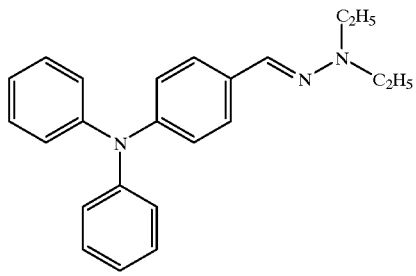

(2)

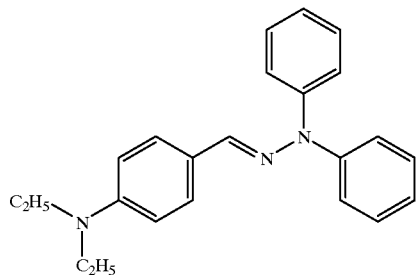

(3)

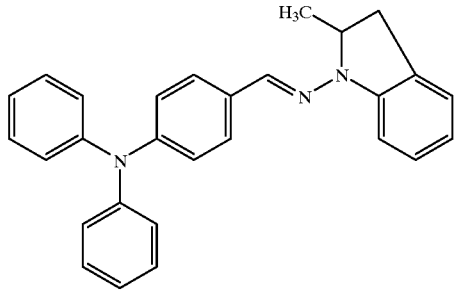

(4)

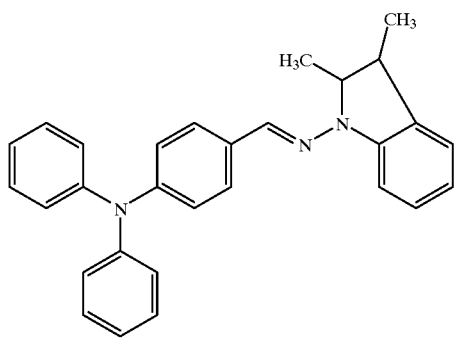
(5)
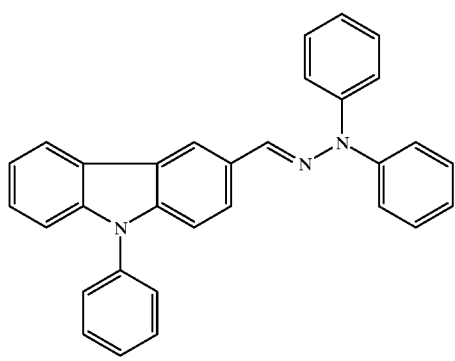
(6)
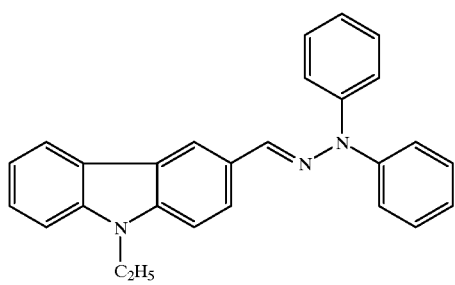
(7)
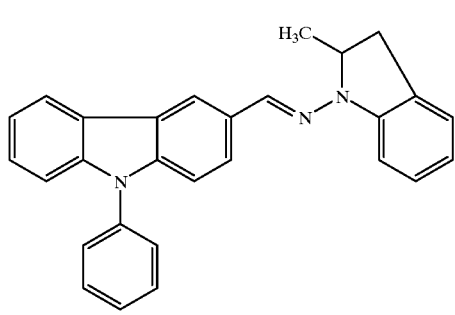
(8)

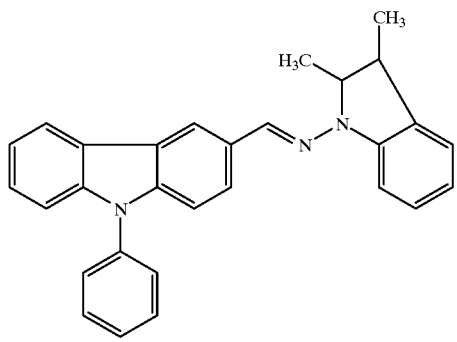
(9)
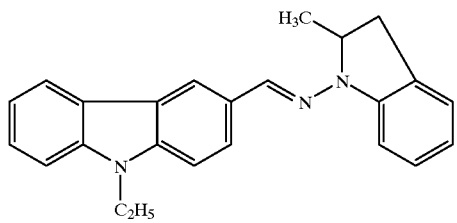
(10)
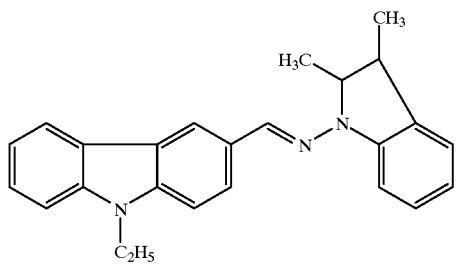
(11)
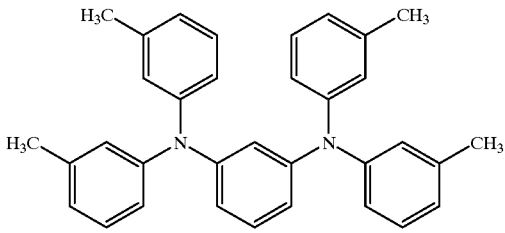
(12)
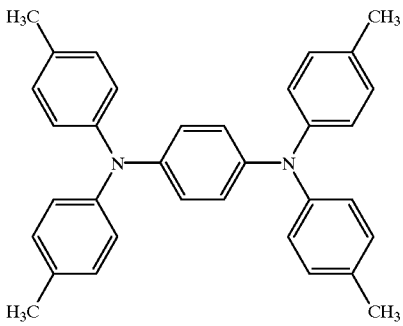
(13)

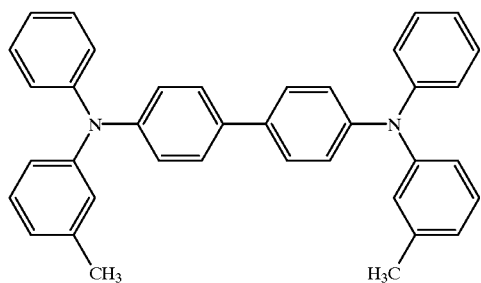
(14)
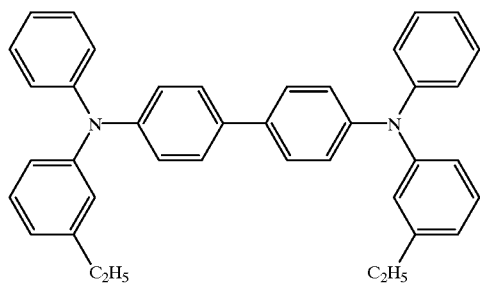
(15)
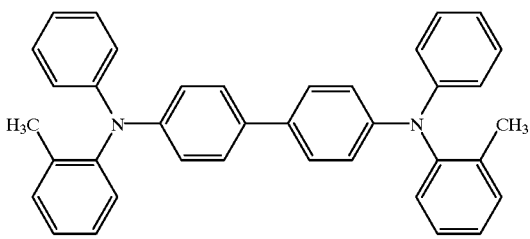
(16)
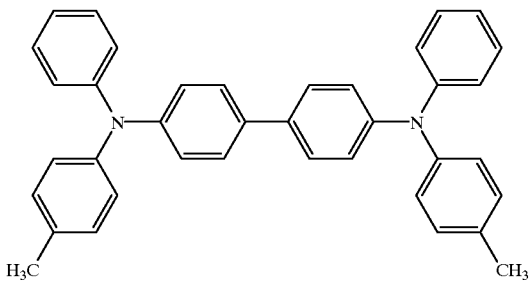
(17)
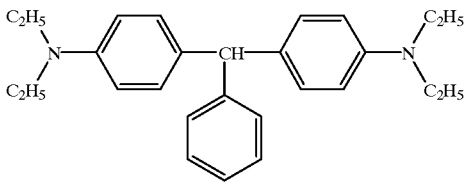
(18)

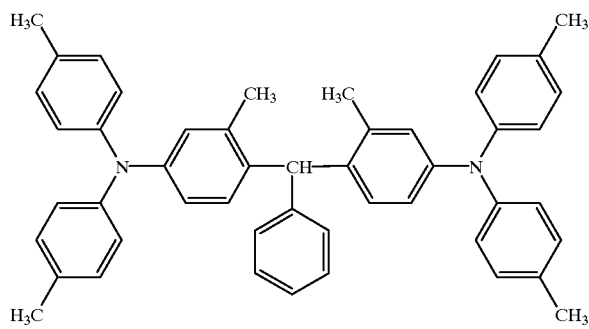
(19)
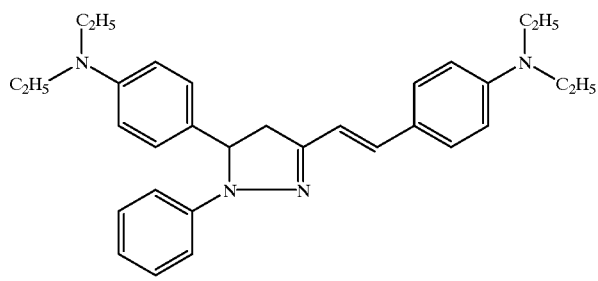
(20)
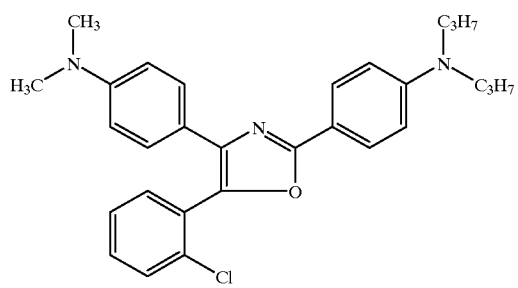
(21)
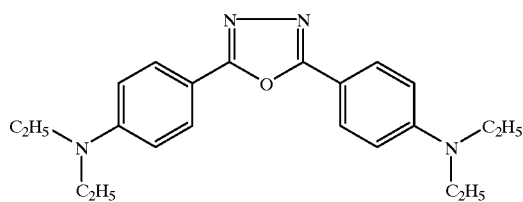
(22)
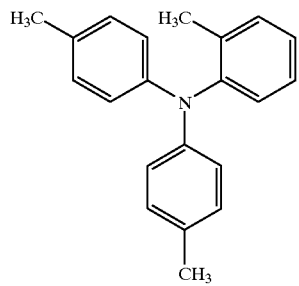
(23)

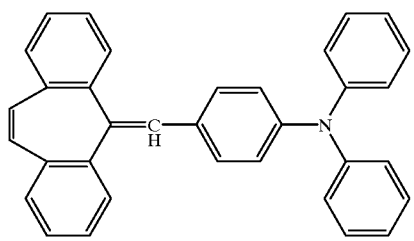
(24)
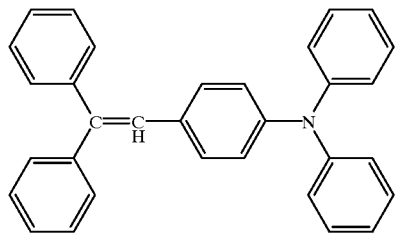
(25)
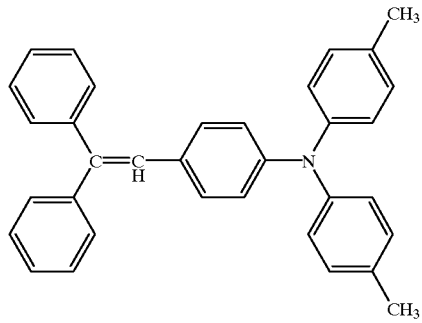
(26)
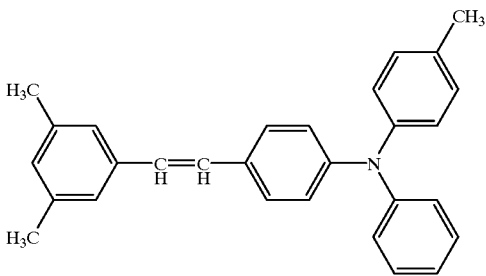
(27)
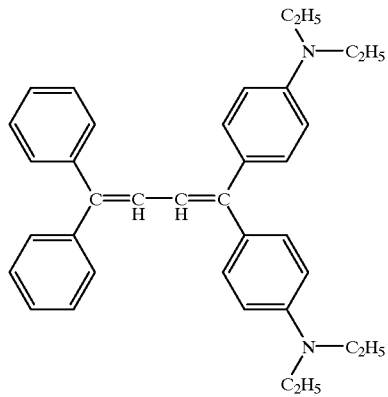
(28)

-continued
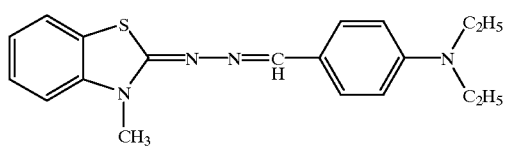
(29)
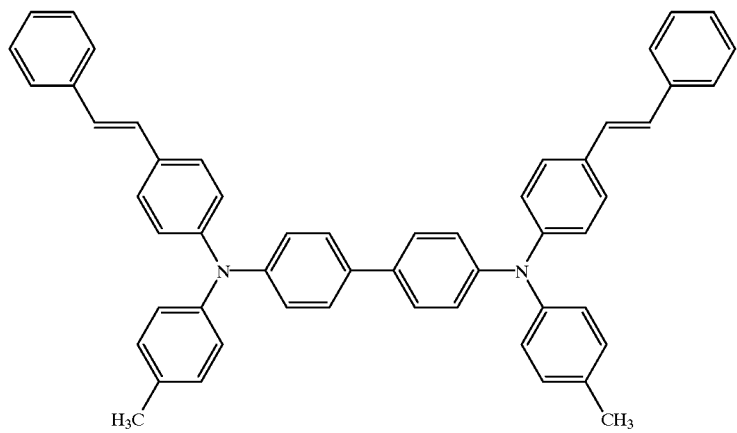
(30)
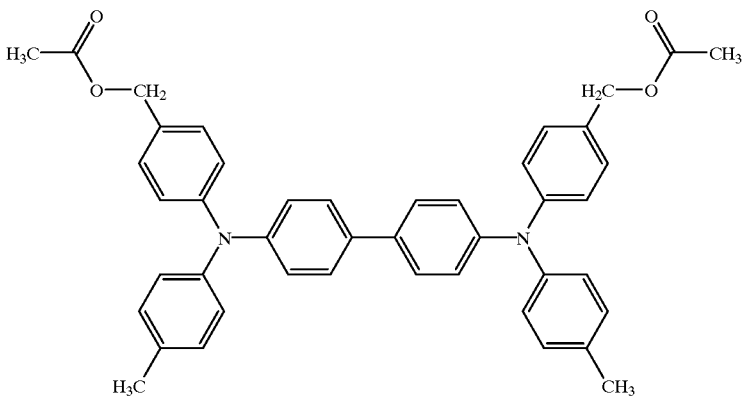
(31)
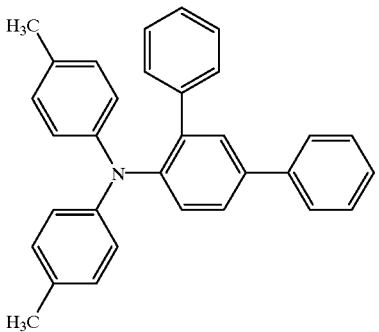
(32)

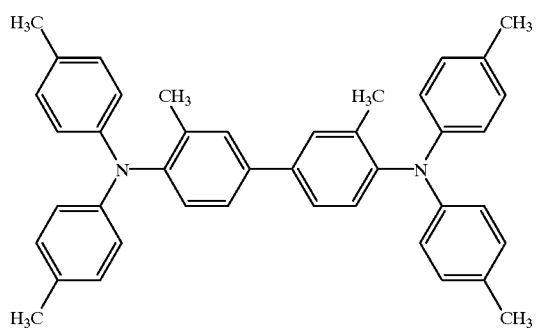
(33)
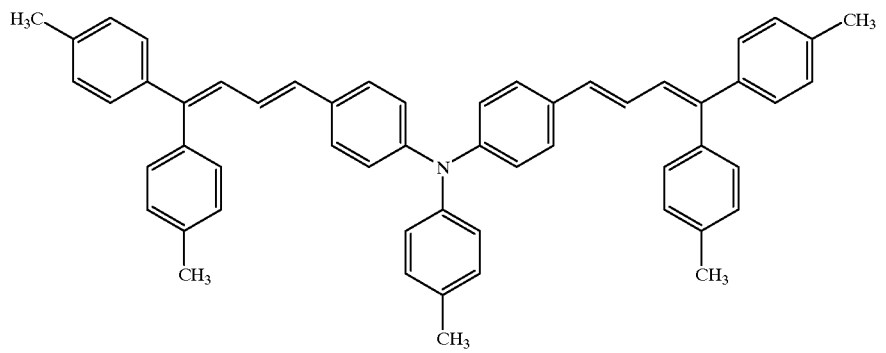
(34)
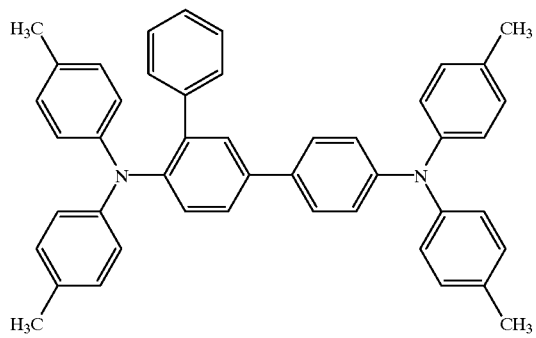
(35)
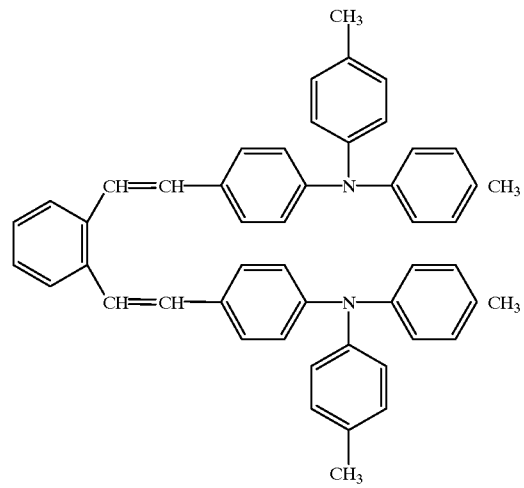
(36)

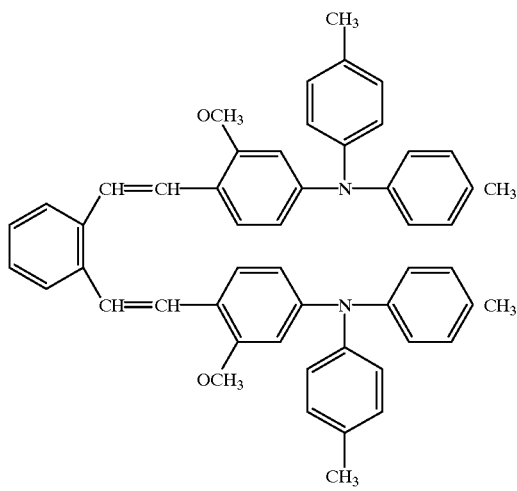

(37)

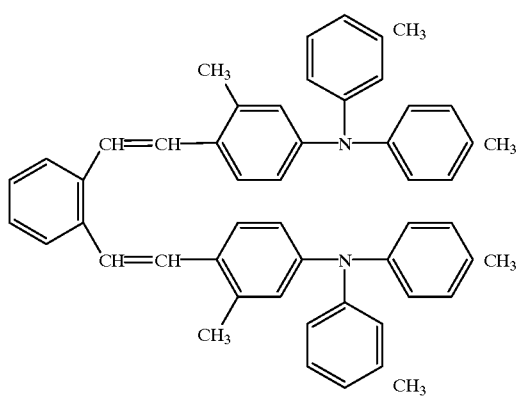

(38)

Electrophotographic photoreceptors in various forms have been known. The electrophotographic photoreceptor of the present invention may be in any of these forms. The electrophotographic photoreceptor of the present invention will be further described in connection with FIGS. 1 to 3 by way of example.

Figure 2:
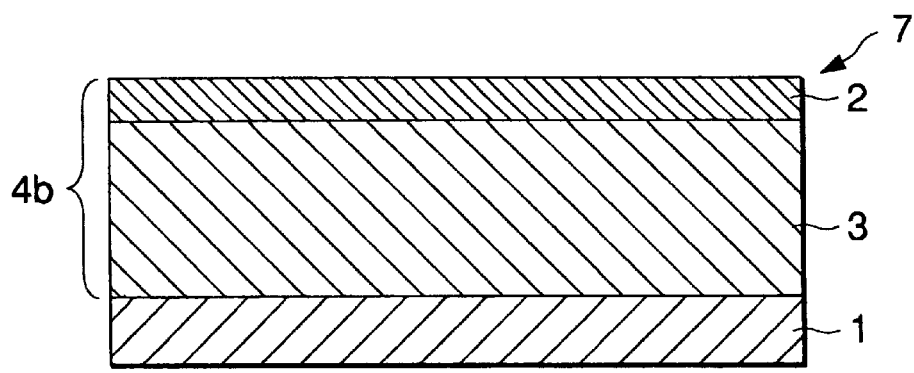
FIG. 2 is a sectional view illustrating another example of the layer structure of the electrophotographic photoreceptor according to the present invention.

The electrophotographic-photoreceptors 7 of FIGS. 1 and 2 each comprise a photosensitive layer 4a or 4b consisting of a charge-generating layer 2 and a charge-transporting layer 3 provided on an electrically-conductive support 1. The electrophotographic photoreceptor of FIG. 3 comprises a photosensitive layer 4c provided on an electrically-conductive support 1, said photosensitive layer 4c having a charge-generating material 5 dispersed in a charge transfer medium 6.

In the case of the electrophotographic photoreceptors of FIGS. 1 and 2, the charge-generating material incorporated in the charge-generating layer 2 generates electric charge while the charge-transporting layer 3 accepts and transports the electric charge. In other words, the generation of electric charge necessary for light decay is effected in the charge-generating material while the transportation of the electric charge thus generated is effected in the charge-transporting medium. In the electrophotographic photoreceptor of FIG. 3, the charge-generating material generates electric charge when irradiated with light while the charge-transporting medium transports the electric charge thus generated.

The electrophotographic photoreceptor of FIG. 1 can be prepared by a process which comprises dispersing a particulate charge-generating material in a solvent optionally having a binder resin dissolved therein to obtain a dispersion, applying the dispersion to an electrically-conductive support, drying the coated material, applying a solution of a charge-transporting material singly or optionally in combination with a binder resin to the charge-generating layer, and then drying the coated material.

The electrophotographic photoreceptor of FIG. 2 can be prepared by a process which comprises applying a solution of a charge-transporting material singly or optionally in combination with a binder resin to an electrically-conductive support, drying the coated material, applying a dispersion obtained by dispersing a particulate charge-generating material in a solvent or binder resin solution to the charge-transporting layer, and then drying the coated material.

Figure 3:
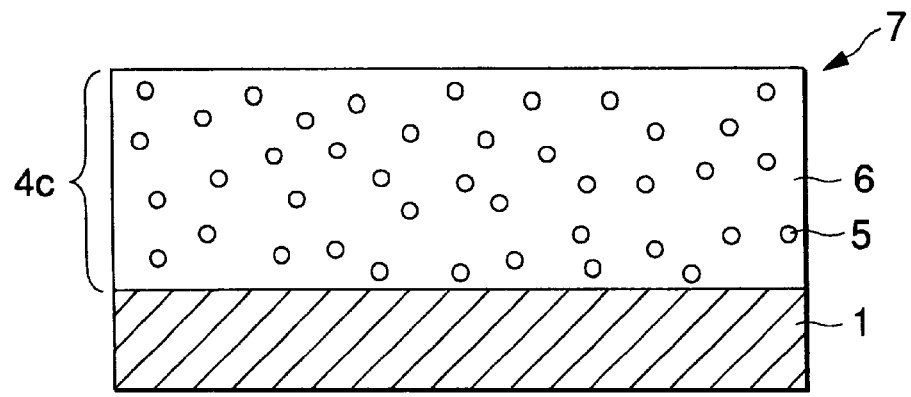
FIG. 3 is a sectional view illustrating a further example of the layer structure of the electrophotographic photoreceptor according to the present invention.

The electrophotographic photoreceptor of FIG. 3 can be prepared by a process which comprises dispersing a particulate charge-generating material in a solution of a charge-transporting material singly or optionally in combination with a binder resin, applying the dispersion to an electrically-conductive support, and then drying the coated material. Alternatively, the electrophotographic photoreceptor of FIG. 3 may be prepared free of charge-transporting material.

Examples of the apparatus to be used in the process which comprises grinding the phthalocyanine compound of the present invention to be used as a charge-generating material, and then dispersing the particulate material in a binder resin solution include ordinary-agitators, homomixer, disperser, agitor, ball mill, sand mill, attritor, and paint conditioner. The present invention is not limited to these apparatus.

Examples of the coating method employable herein include dip coating method, spray coating method, spin coating method, bead coating method, wire bar coating method, blade coating method, roller coating method, and curtain coating method.

Referring to the thickness of the photosensitive layer, the thickness of the charge-generating layer is not more than 5 μm, preferably from 0.01 to 2 μm while the thickness of the charge-transporting layer is from 3 to 50 μm, preferably from 5 to 30 μm in the case of the electrophotographic photoreceptors of FIGS. 1 and 2. In the case of the electrophotographic photoreceptor of FIG. 3, the thickness of the photosensitive layer is from 3 to 50 μm, preferably from 5 to 30 μm.

In the electrophotographic photoreceptors of FIGS. 1 and 2, the proportion of the charge-transporting material in the charge-transporting layer is preferably from 5 to 100% by weight while the proportion of the charge-generating material in the charge-generating layer is preferably from 5 to 100% by weight, particularly from 40 to 80% by weight.

In the electrophotographic photoreceptor of FIG. 3, the proportion of the charge-transporting material and the charge-generating material in the photosensitive layer are preferably from 5 to 99% by weight and preferably from 1 to 50% by weight, particularly from 3 to 20% by weight, respectively.

In the preparation of any of the electrophotographic photoreceptors of FIGS. 1 to 3, the binder resin may be used in combination with a plasticizer and a sensitizer.

Examples of the electrically-conductive support to be used in the electrophotographic photoreceptor of the present invention include metal plate or metallic drum made of a metal such as aluminum, copper, zinc, stainless steel, chromium, titanium, nickel, molybdenum, vanadium, indium, gold and platinum or alloy thereof, and paper or plastic film coated, vapor-deposited or laminated with an electrically-conductive compound such as electrically-conductive polymer and indium oxide and a metal such as aluminum, palladium and gold or alloy thereof.

As the binder resin which can be optionally used there is preferably used a hydrophobic high molecular polymer which can form an electrical insulating film. Examples of such a high molecular polymer include polycarbonate, polyester, methacrylic resin, acrylic resin, polyvinyl chloride, polyvinylidene chloride, polystyrene, polyvinyl acetate, styrene-butadiene copolymer, vinyl chloride-vinyl acetate-maleic anhydride copolymer, silicone resin, silicone-alkyd resin, phenol-formaldehyde resin, styrene-alkyd resin, poly-N-vinylcarbazole, polyvinyl butyral, polyvinyl formal, and polysulfone. However, the binder resin of the present invention is not limited to these high molecular polymers. These binder resins may be used singly or in admixture.

These binder resins may be used in combination with a surface modifier. Examples of such a surface modifier include silicone oil, and fluororesin.

The electrophotographic photoreceptor of the present invention may comprise a known plasticizer incorporated therein to enhance the film-forming properties, flexibility and mechanical strength thereof. Examples of the plasticizer include biphenyl, biphenyl chloride, o-terphenyl, p-terphenyl, dibutyl phthalate, diethyl glycol phthalate, dioctyl phthalate, triphenylphosphoric acid, methyl naphthalene, benzophenone, chlorinated paraffin, polypropylene, polystyrene, various fluorohydrocarbons, ester phthalate, ester phosphate, halogenated paraffin and aromatic compounds such as methyl naphthalene.

As the sensitizer to be incorporated in the photosensitive layer there may be used any known such a material.

Examples of the sensitizer employable herein include triphenylmethane dyes such as methyl violet, brilliant green and crystal violet, thiazine dyes such as methyl blue, cyanine dyes, pyrilium dyes, chloranil dyes, tetracyanoethylene, rhodamine B, melocyanine dyes, and thiapyrilium dyes.

The electrophotographic photoreceptor of the present invention may further comprise a deterioration inhibitor such as antioxidant and light stabilizer incorporated in the photosensitive layer to enhance its preservability, durability and environmental dependence stability. Examples of the deterioration inhibitor employable herein include phenolic compounds, hydroquinone compounds, and amine compounds. Specific examples of these compounds include butylhydroxytoluene.

Moreover, the electrophotographic photoreceptor of the present invention may comprise various additives incorporated therein as well so far as the effect of the present invention is not impaired.

In the present invention, an adhesive layer or barrier layer may be optionally provided interposed between the electrically-conductive support and the photosensitive layer to enhance the adhesivity between the electrically-conductive support and the photosensitive layer or inhibit the injection of free charge from the electrically-conductive support into the photosensitive layer.

Examples of the material to be used in these layers include the foregoing polymer compounds to be used as binder resin, casein, gelatin, polyvinyl alcohol, ethyl cellulose, nitrocellulose, polyvinyl butyral, phenolic resin, polyamide, carboxy-methyl cellulose, vinylidene chloride-based polymer latex, styrene-butadiene-based polymer latex, polyurethane, aluminum oxide (almite), tin oxide, and titanium oxide. The thickness of these layers are each preferably not more than 1 μm.

The electrophotographic photoreceptor and phthalocyanine compound of the present invention have the foregoing constitution and thus exhibit excellent properties as made clear in the following examples.

The present invention will be further described in the following examples, but the present invention should not be construed as being limited thereto. The term "parts" as used herein is meant to indicate "parts by weight".

Synthesis Example 1

Figure 4:
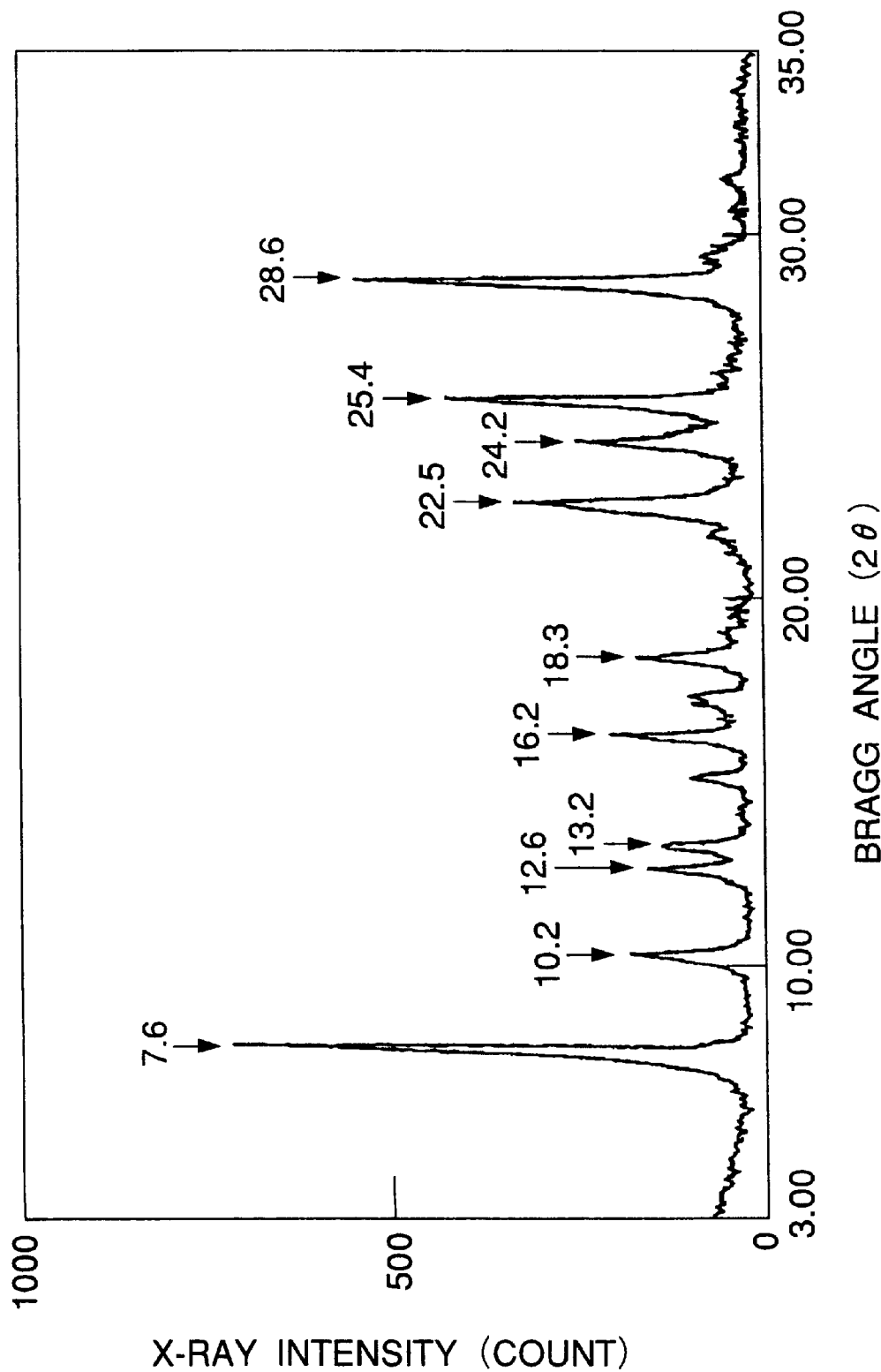
FIG. 4 is a diagram illustrating the powder X-ray diffraction spectrum with Cukα ray of oxytitanium phthalocyanine used to obtain a phthalocyanine compound according to the present invention obtained in Synthesis Example 1.
Figure 5:
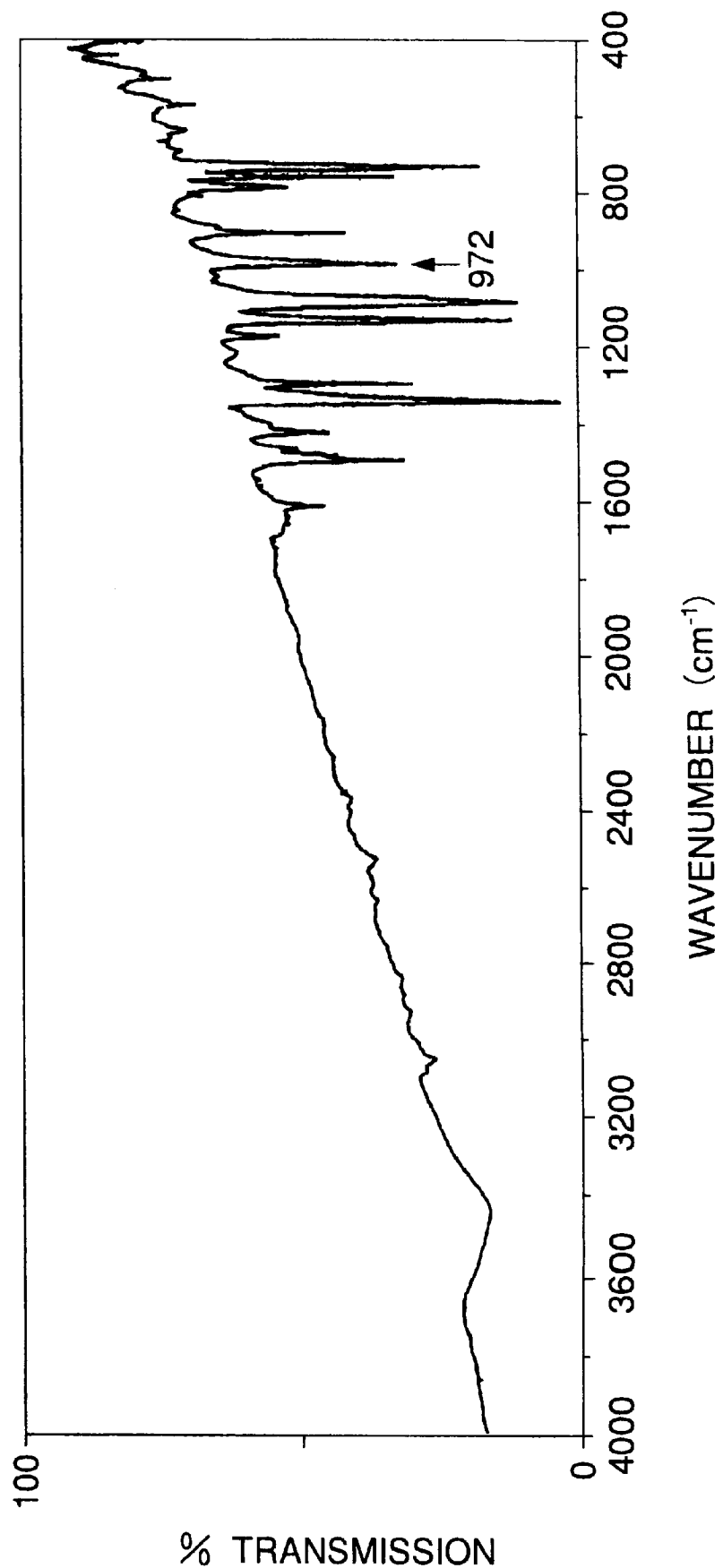
FIG. 5 is a diagram illustrating IR absorption spectrum of oxytitanium phthalocyanine used to obtain the phthalocyanine compound according to the present invention obtained in Synthesis Example 1.

20 parts by weight of oxytitanium phthalocyanine obtained by the reaction of titanium tetrachloride with orthophthailonitrile having a spectrum as shown in FIG. 4 in powder X-ray diffractometry with CuKα ray and a spectrum as shown in FIG. 5 in IR absorption and 9.0 parts of 2,2'-biphenyldiol were allowed to undergo reaction in 240 parts of α-chloronaphthalene with stirring at a temperature of from 195° C. to 205° C. for 1.5 hours.

The reaction mixture was allowed to cool to room temperature, withdrawn by filtration, washed with benzene, methanol, DMF (dimethylformamide) and then water, and then dried under reduced pressure to obtain a phthalocyanine compound in the form of blue powder.

Figure 6:
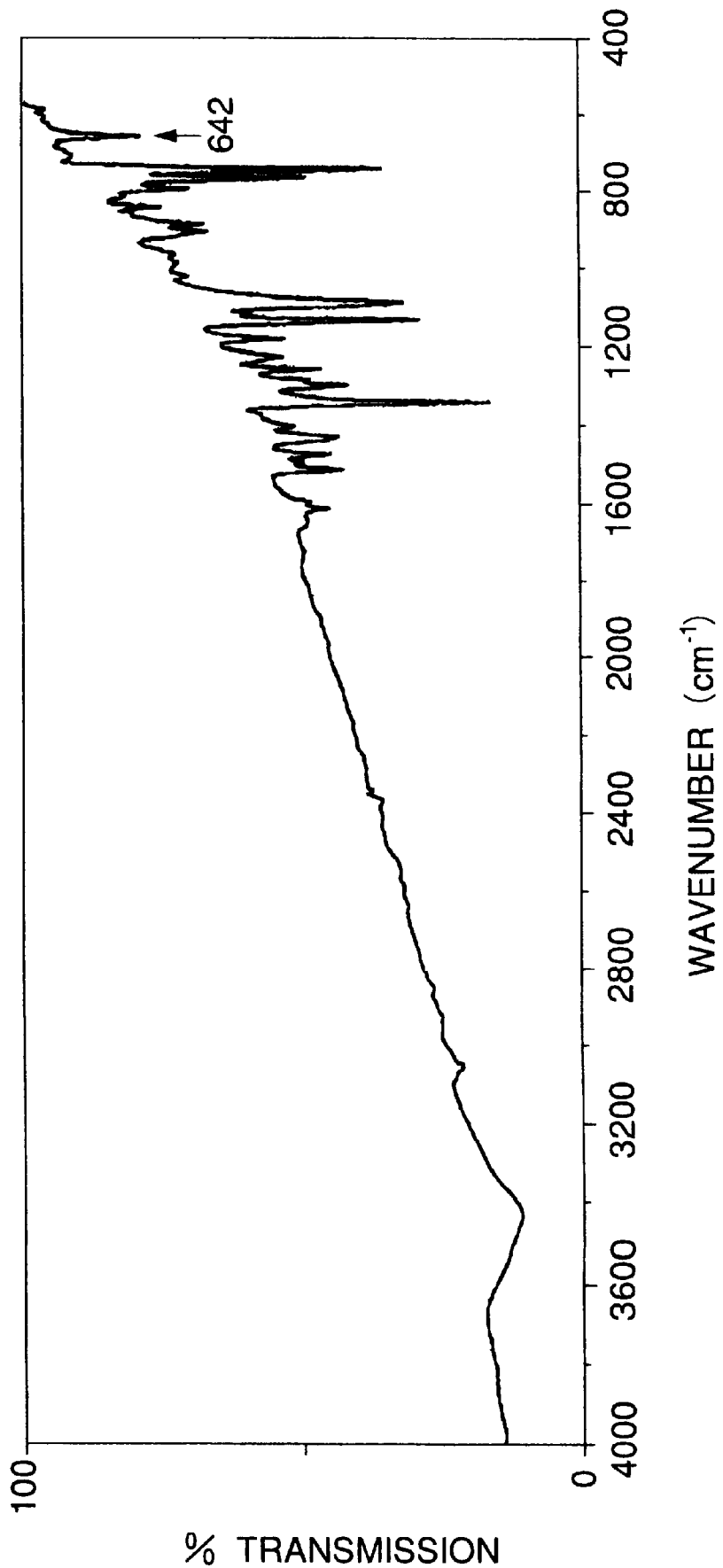
FIG. 6 is a diagram illustrating IR absorption spectrum of the phthalocyanine compound according to the present invention obtained in Synthesis Example 1.

The phthalocyanine compound thus obtained exhibits a peak at m/z=744 in mass spectrum and a spectrum as shown in FIG. 6 in IR absorption and thus can be found to be a phthalocyanine compound represented by the following formula (5):

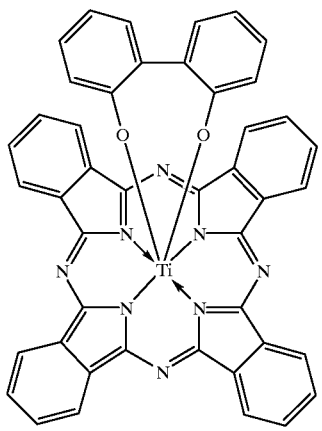

(5)

Figure 7:
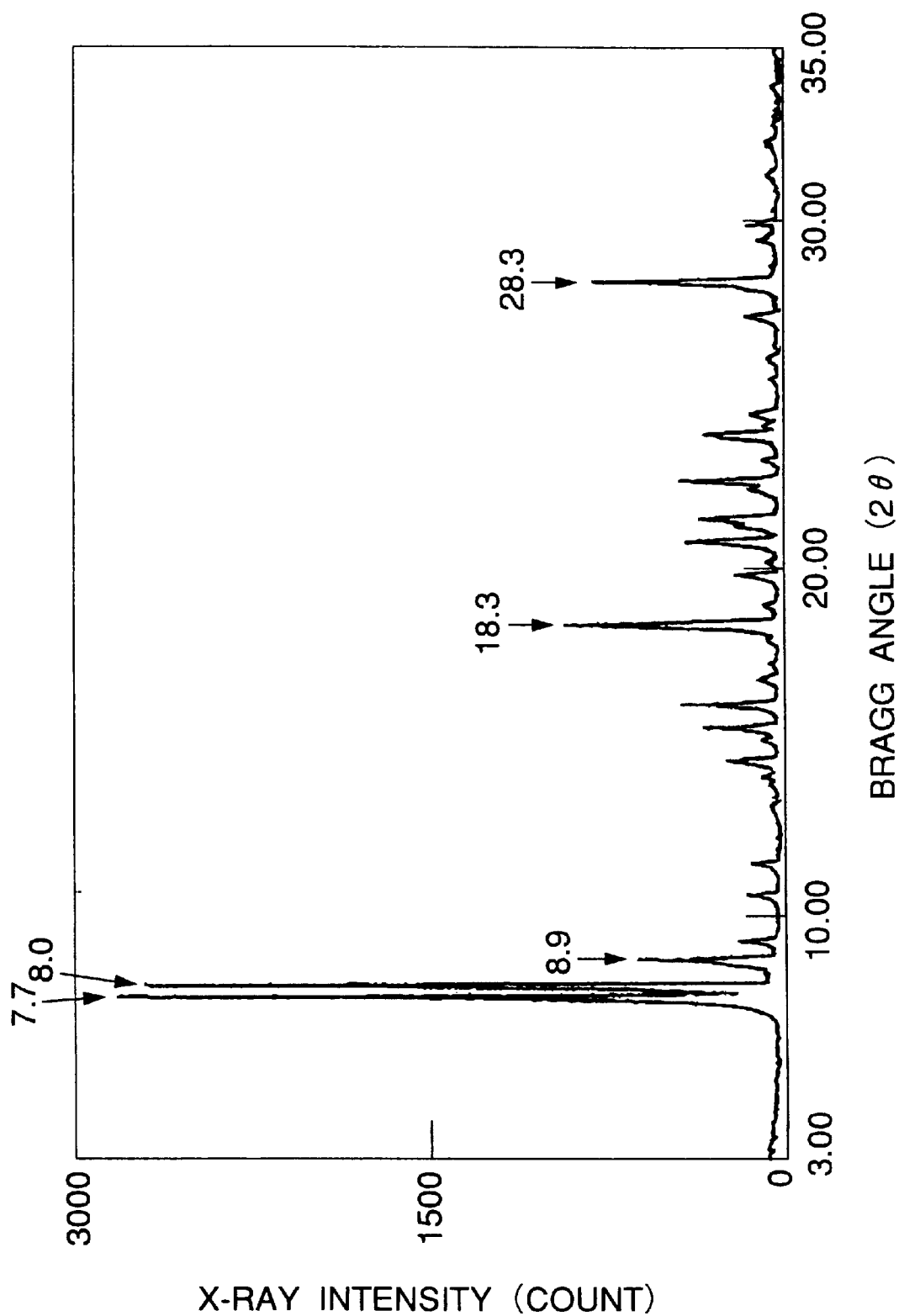
FIG. 7 is a diagram illustrating the powder X-ray diffraction spectrum with Cukα ray of the phthalocyanine compound according to the present invention obtained in Synthesis Example 1.
Figure 8:
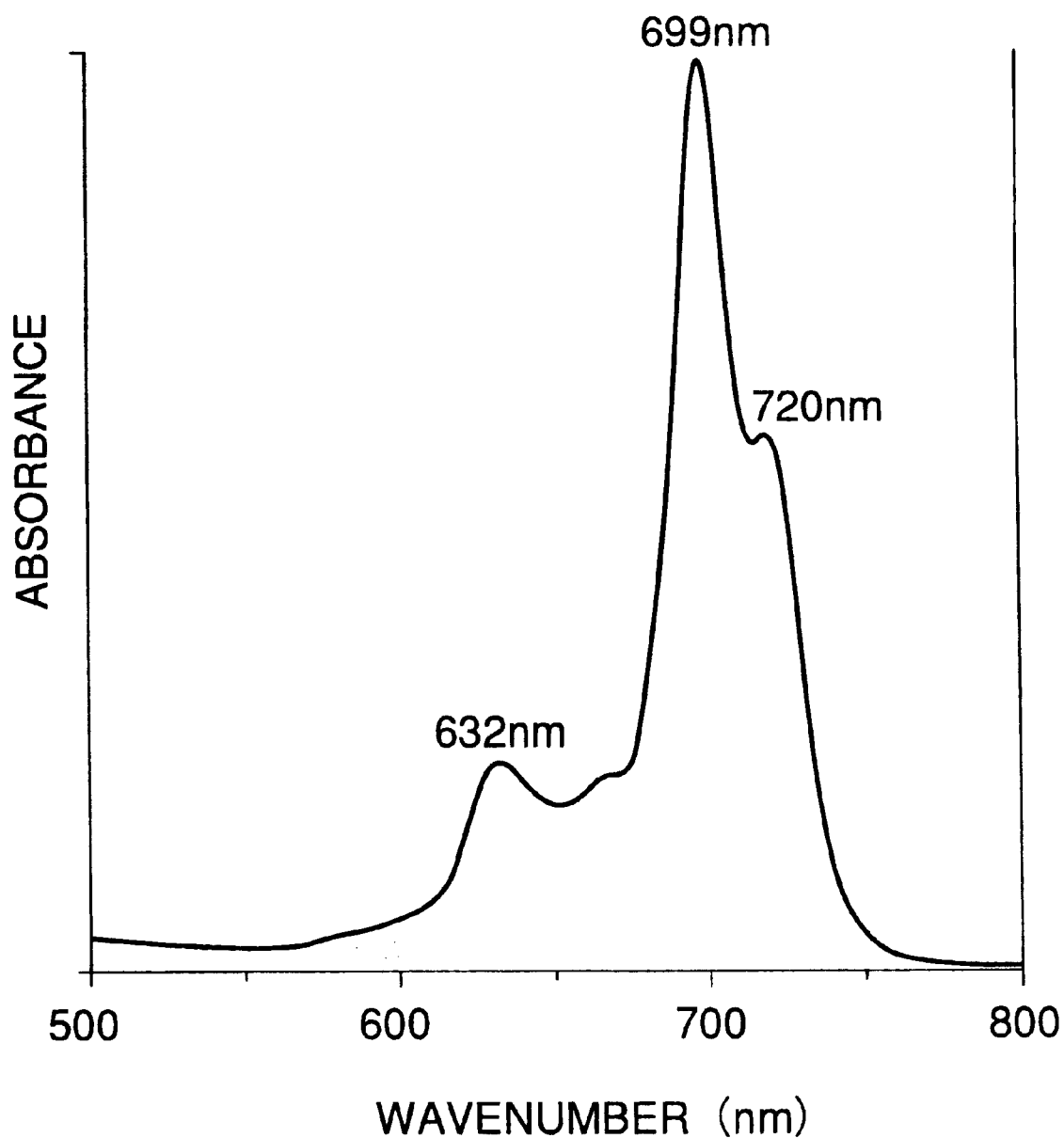
FIG. 8 is a diagram illustrating the light absorption spectrum of an α-chloronaphthalene solution of the phthalocyanine compound according to the present invention obtained in Synthesis Example 1.

The powder X-ray diffraction spectrum of the phthalocyanine compound thus obtained with Cuα ray is shown in FIG. 7. The light absorption spectrum of an α-chloronaphthalene solution of the phthalocyanine compound thus obtained is shown in FIG. 8.

The phthalocyanine compound thus obtained was able to cope with infrared light source-more thoroughly than conventional phthalocyanine compounds.

(Preparation of Coating Solution for Charge-generating Layer (CGL) 1)

(1) 2 parts of the phthalocyanine compound represented by the foregoing general formula (5) obtained in Synthesis Example 1 and 1 part of a butyral resin (S-Lec BH-3, available from Sekisui Chemical Co., Ltd.) were roll-milled with a mixture of methanol and ethyl acetate, and then ground to obtain a chipped pigment-dispersed resin. 4.5 parts of the chip thus obtained were added to a mixed solvent of 78 parts of methylene chloride and 117 parts of 1,1,2-trichloroethane, and then subjected to dissolution and dispersion with glass beads in a sand grinder to obtain a dispersion A of a charge-generating material of a phthalocyanine compound.

(2) 2.2 parts of an α type oxytitanium phthalocyanine and 1 part of a butyral resin (S-Lec BH-3, available from Sekisui Chemical Co., Ltd.) were added to a mixed solvent of 52 parts of methylene chloride and 78 parts of 1,1,2-trichloroethane, and then subjected to dispersion in admixture with glass beads in a sand mill to obtain a dispersion B of a charge-generating material of a titanium phthalocyanine compound.

Figure 9:
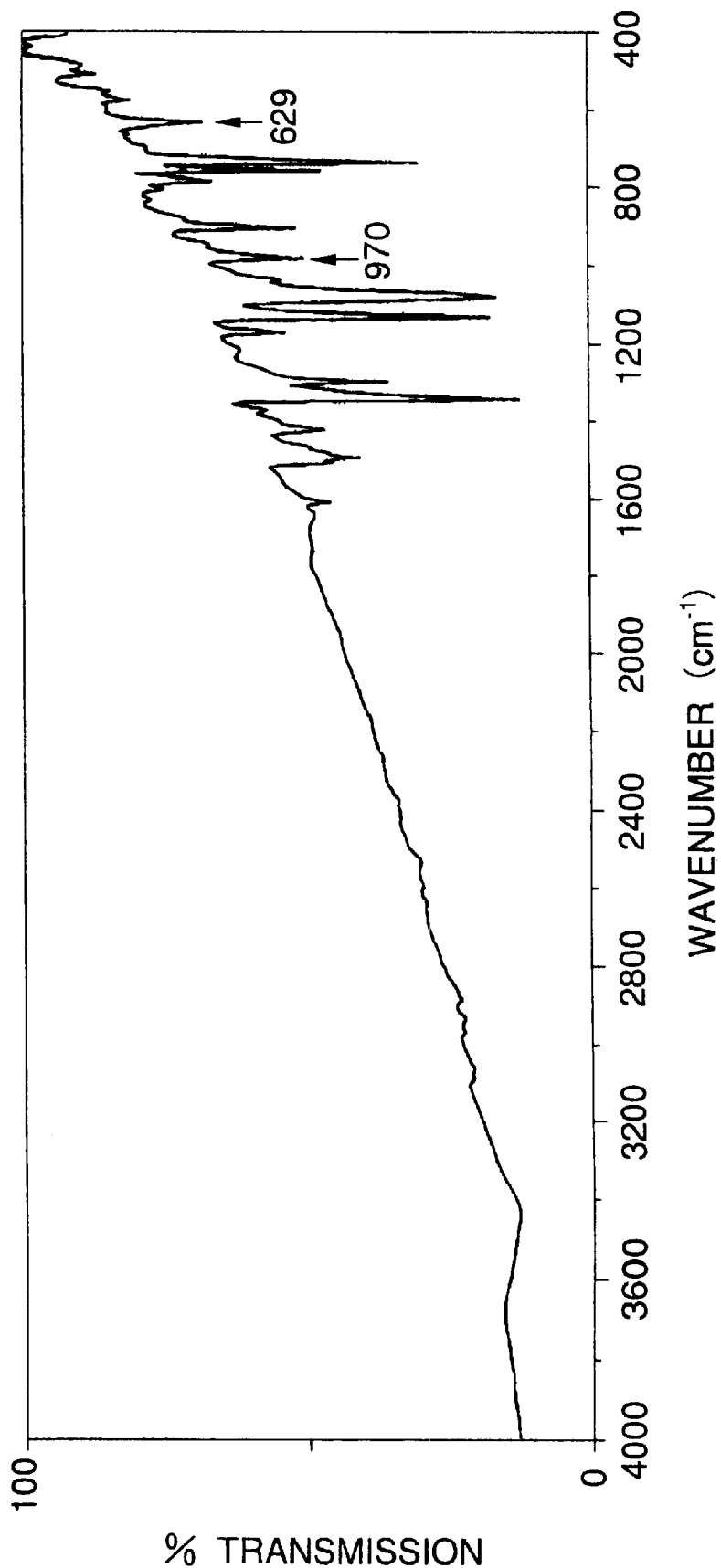
FIG. 9 is a diagram illustrating IR absorption spectrum of a titanium phthalocyanine compound used to obtain a charge-generating material dispersion C of titanium phthalocyanine compound used in the examples.
Figure 10:
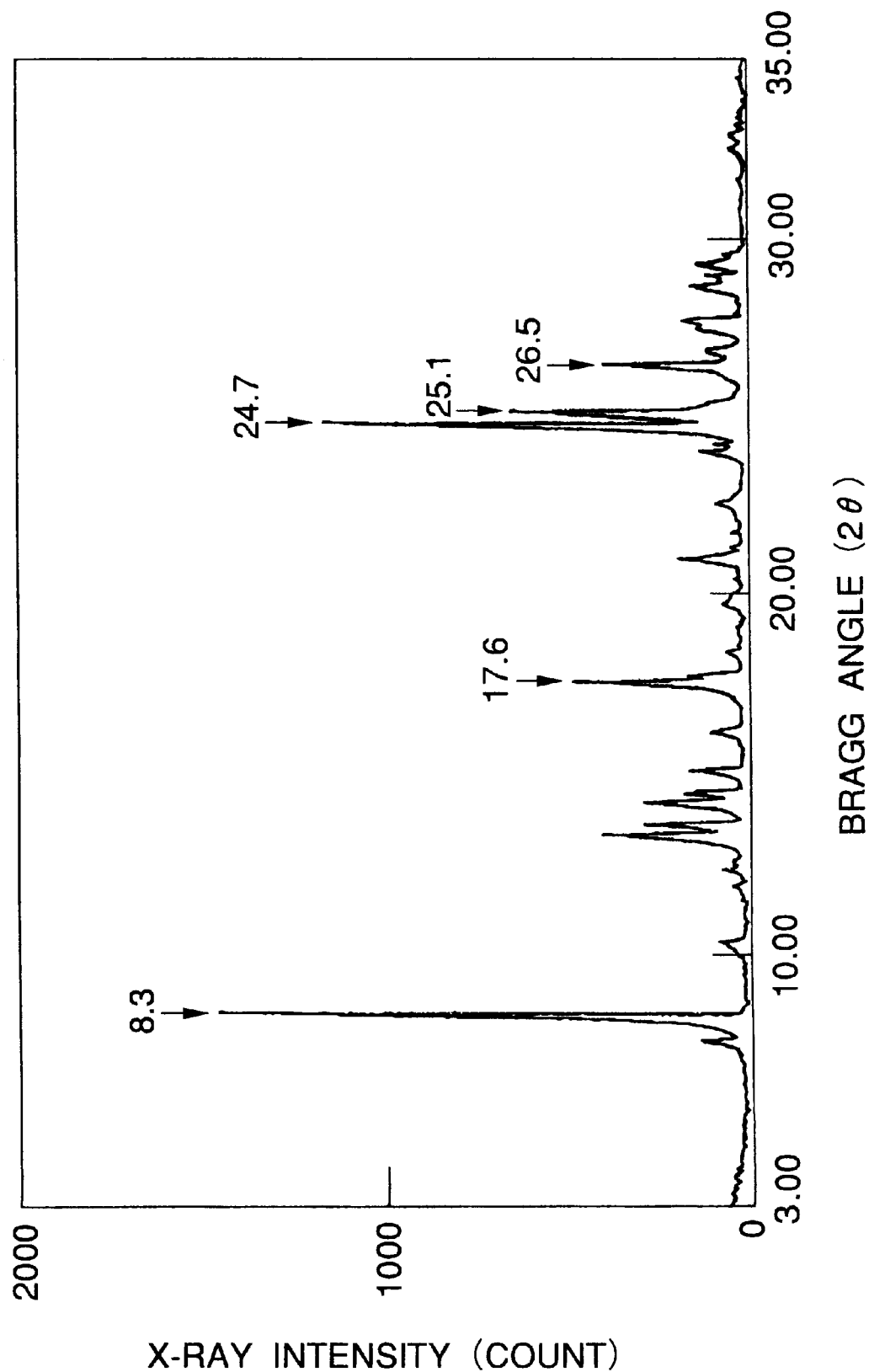
FIG. 10 is a diagram illustrating the powder X-ray diffraction spectrum with Cukα ray of the titanium phthalocyanine compound used to obtain a charge-generating material dispersion C of titanium phthalocyanine compound used in the examples.

(3) 1 part of a titanium phthalocyanine compound as a mixed crystal of oxytitanium phthalocyanine and (2R,3R)-2,3-butyleneglycolatotitanium phthalocyanine showing a peak at m/z=576 and 648 in mass spectrum, a spectrum as shown in FIG. 9 in IR absorption and a spectrum as shown in FIG. 10 in powder X-ray diffractometry with Cuα ray and 1 part of a butyral resin (S-Lec BH-3, available from Sekisui Chemical Co., Ltd.) were added to a mixed solvent of 48 parts of methylene chloride and 72 parts of 1,1,2-trichloroethane, and then subjected to dispersion in admixture in a sand mill with glass beads to obtain a dispersion C of a charge-generating material of a titanium phthalocyanine compound.

(Preparation of Coating Solution for Charge-generating Layer (CGL) 2)

(1) The foregoing charge-generating material dispersions A and B were mixed at a weight ratio of (I) 5:95, (II) 20:80, (III) 40:60, (IV) 60:40 and (V) 80:20 to obtain charge-generating material dispersions (I), (II), (III), (IV) and (V), respectively.

(2) The foregoing charge-generating material dispersions A and C were mixed at a weight ratio of (VI) 5:95, (VII) 20:80, (VIII) 40:60, (IX) 60:40 and (X) 80:20 to obtain charge-generating material dispersions (VI), (VII), (VIII), (IX) and (X), respectively. (Preparation of coating solution for charge-generating layer (CTL)

14.4 parts of a hydrazone compound as the foregoing exemplified charge-transporting material represented by the exemplification number (10) and 16 parts of a polycarbonate resin (Iupilon Z200, available from Mitsubishi Gas Chemical Company, Inc.) were dissolved in a mixed solvent of 67 parts of methylene chloride and 17 parts of monochlorobenzene to obtain a coating solution for charge-transporting layer (CTL).

EXAMPLE 1

The foregoing charge-generating material dispersion A was applied to a PET film vacuum-deposited with aluminum by means of a bar coater to form a charge-generating layer having a dry thickness of 0.3 μm. The charge-generating layer thus formed was then coated with the foregoing coating solution for charge-transporting layer (CTL) by means of a bar coater to form a charge-transporting layer having a dry thickness of 15 μm to obtain an electrophotographic photoreceptor having a layer structure shown in FIG. 1.

EXAMPLE 2

An electrophotographic photoreceptor was prepared in the same manner as in Example 1 except that the foregoing charge-generating material dispersion (I) was used instead of the charge-generating material dispersion A.

EXAMPLE 3

An electrophotographic photoreceptor was prepared in the same manner as in Example 1 except that the foregoing charge-generating material dispersion (II) was used instead of the charge-generating material dispersion A.

EXAMPLE 4

An electrophotographic photoreceptor was prepared in the same manner as in Example 1 except that the foregoing charge-generating material dispersion (III) was used instead of the charge-generating material dispersion A.

EXAMPLE 5

An electrophotographic photoreceptor was prepared in the same manner as in Example 1 except that the foregoing charge-generating material dispersion (IV) was used instead of the charge-generating material dispersion A.

EXAMPLE 6

An electrophotographic photoreceptor was prepared in the same manner as in Example 1 except that the foregoing charge-generating material dispersion (V) was used instead of the charge-generating material dispersion A.

EXAMPLE 7

An electrophotographic photoreceptor was prepared in the same manner as in Example 1 except that the foregoing charge-generating material dispersion (VI) was used instead of the charge-generating material dispersion A.

EXAMPLE 8

An electrophotographic photoreceptor was prepared in the same manner as in Example 1 except that the foregoing charge-generating material dispersion (VII) was used instead of the charge-generating material dispersion A.

EXAMPLE 9

An electrophotographic photoreceptor was prepared in the same manner as in Example 1 except that the foregoing charge-generating material dispersion (VIII) was used instead of the charge-generating material dispersion A.

EXAMPLE 10

An electrophotographic photoreceptor was prepared in the same manner as in Example 1 except that the foregoing charge-generating material dispersion (IX) was used instead of the charge-generating material dispersion A.

EXAMPLE 11

An electrophotographic photoreceptor was prepared in the same manner as in Example 1 except that the foregoing charge-generating material dispersion (X) was used instead of the charge-generating material dispersion A.

Comparative Example 1

2 parts of a metal-free phthalocyanine and 2 parts of a butyral resin (S-Lec BH-3, available from Sekisui Chemical Co., Ltd.) were added to a mixture of 66 parts of methylene chloride and 99 parts of 1,1,2-trichloroethane, and then subjected to dispersion in admixture in a sand mill with glass beads to obtain a charge-generating material dispersion D.

The charge-generating material dispersions B and D were mixed at a ratio of 20:80 by mass to obtain a charge-generating material dispersion (XI).

An electrophotographic photoreceptor was prepared in the same manner as in Example 1 except that the foregoing charge-generating material dispersion (XI) was used instead of the charge-generating material dispersion A.

Comparative Example 2

An electrophotographic photoreceptor was prepared in the same manner as in Example 1 except that the foregoing charge-generating material dispersion B was used instead of the charge-generating material dispersion A.

Comparative Example 3

An electrophotographic photoreceptor was prepared in the same manner as in Comparative Example 2 except that the thickness of the charge-generating layer was changed from 0.3 $\mu$m to 0.2 $\mu$m.

In an attempt to form a charge-generating layer having a thickness of less than 0.2 $\mu$m, the charge-generating material dispersion D was used. However, it was unsuccessful.

(Evaluation)

The characteristics of the various electrophotographic photoreceptors obtained in Examples 1 to 11 and Comparative Examples 1 to 3 were measured by means of an electrostatic paper analyzer (EPA-8100, available from Kawaguchi Electric Works, Ltd.).

The electrophotographic photoreceptor is charged with −6 kV corona discharge in the dark place. The surface potential of the electrophotographic photoreceptor at this point is defined as $V_0$ (−V). The electrophotographic photoreceptor thus charged is then allowed to stand in the dark place for 10 seconds. The surface potential of the electrophotographic photoreceptor at this point is defined as $V_{10}$ (−V). The percent surface potential retention $V_{10}/V_0$ (DDR) on the electrophotographic photoreceptor was calculated from $V_0$ and $V_{10}$.

The electrophotographic photoreceptor is then exposed to light having a wavelength of 780 nm and a light power of 0.5 $\mu$W/cm$^2$. The time required until the surface potential of the electrophotographic photoreceptor is reduced to the half of $V_{10}$ is then measured to determine the half-decay exposure $E_{1/2}$ ($\mu$J/cm$^2$).

$V_0$ of the various electrophotographic photoreceptors were each from −800 V to −1,000 V.

The results of measurements of the electrophotographic photoreceptors of Examples 1 to 11 are set forth in Table 1.

TABLE 1

| Example No. | DDR (%) | $E_{1/2}(\mu J/cm^2)$ |
| --- | --- | --- |
| Example 1 | 98.5 | 3.28 |
| Example 2 | 81.0 | 0.42 |
| Example 3 | 82.8 | 0.45 |
| Example 4 | 83.8 | 0.52 |
| Example 5 | 85.5 | 0.69 |
| Example 6 | 90.0 | 1.07 |
| Example 7 | 84.0 | 0.17 |
| Example 8 | 80.3 | 0.20 |
| Example 9 | 85.6 | 0.25 |
| Example 10 | 86.2 | 0.37 |
| Example 11 | 96.9 | 0.72 |

The results of Examples 1 to 6 set forth in Table 1 show that the electrophotographic photoreceptors having the same thickness comprising a dispersion of a charge-generating material of a phthalocyanine compound and a dispersion of a charge-generating material of a titanium phthalocyanine compound at different mixing ratios vary 2.5 times in photosensitivity.

The results of Examples 1 and 7 to 11 set forth in Table 1 show that the electrophotographic photoreceptors having the same thickness comprising a dispersion of a charge-generating material of a phthalocyanine compound and a dispersion of a charge-generating material of a titanium phthalocyanine compound at different mixing ratios vary 4.2 times in photosensitivity.

It was also found that the more the proportion of phthalocyanine compound is, the higher is the percent potential retention in any of the foregoing combinations.

It was further found that even the electrophotographic photoreceptor of Example 1 comprising a phthalocyanine compound alone exhibits practical characteristics.

The results of measurements of Example 6 and Comparative Examples 1 to 3 are set forth in Table 2.

TABLE 2

| Example No. | $E_{1/2}(\mu J/cm^2)$ |
| --- | --- |
| Example 6 | 1.07 |
| Comparative Example 1 | 0.46 |
| Comparative Example 2 | 0.39 |
| Comparative Example 3 | 0.51 |

Table 2 shows that Example 6 and Comparative Example 2 differ as much as 2.7 times in photosensitivity while the combinations other than that of the present invention can be adjusted for photosensitivity only by 1.2 times as in Comparative Examples 1 and 2.

Table 2 also shows that the adjustment of photosensitivity cannot be made within a wide range as in the present invention if it is made only by changing the thickness of the electrophotographic photoreceptor comprising a single charge-generating material.

EXAMPLE 12

3.3 parts of an α type oxytitanium phthalocyanine and 1.5 parts of a butyral resin (S-Lec BH-3, available from Sekisui Chemical Co., Ltd.) were added to a mixed solvent of 78 parts of methylene chloride and 117 parts of 1,1,2-trichloroethane, and then subjected to dispersion in admixture in a sand mill with glass beads to obtain a charge-generating material dispersion B'.

3.3 parts of the phthalocyanine compound represented by the foregoing general formula (5) obtained in Synthesis Example 1 and 1.5 parts of a butyral resin (S-Lec BH-3, available from Sekisui Chemical Co., Ltd.) were roll-milled with a mixed solvent of methanol and ethyl acetate, and then ground to obtain a chipped pigment-dispersed resin. 4.8 parts of the chipped pigment-dispersed resin thus obtained, 78 parts of methylene chloride and 117 parts of 1,1,2-trichloroethane were subjected to dispersion and dissolution with glass beads in a sand mill to obtain a charge-generating material dispersion A'.

The foregoing charge-generating material dispersions A' and B' were mixed at a weight ratio of 30:70 to obtain a charge-generating material dispersion (XII).

Subsequently, a solution of 11.5 parts of a polycarbonate resin (Panlite C-1400, available from Teijin Chemicals Ltd.) in a mixture of 53.1 parts of methylene chloride and 35.4 parts of 1,1,2-trichloroethane was obtained. A 1,3-butadiene-based compound represented by the foregoing Compound No. 28 and a triarylamine-based compound represented by the foregoing Compound No. 32 were then dissolved in the solution thus obtained in an amount of 3.5 parts and 1.5 parts based on 10 parts of the polycarbonate resin in the solution, respectively, to obtain a coating solution for forming an charge-transporting layer.

A solution of 1 part of a polyamide resin (Amilan CM-8000, available from Toray Industries, Inc.) in a mixture of 9.3 parts of methanol, 2 parts of toluene and 2 parts of n-butanol was obtained. The resin solution thus obtained was applied to the outer surface of an aluminum drum having a diameter of 30 mm and a length of 260 mm by a dip coating method to a dry thickness of 1 μm, and then dried to form a barrier layer.

Subsequently, the foregoing charge-generating material dispersion (XII) was applied to the foregoing barrier layer by a dip coating method to a dry thickness of 0.3 μm, and then dried to form a charge-generating layer thereon.

The foregoing coating solution for forming a charge-transporting layer was applied to the charge-generating layer thus formed by a blade coating method to a dry thickness of 24 μm, and then dried to form a charge-transporting layer. Thus, an electrophotographic photoreceptor was obtained.

EXAMPLE 13

An electrophotographic photoreceptor was prepared in the same manner as in Example 12 except that a charge-generating material dispersion (IV') obtained by mixing the charge-generating material dispersions A' and B' at a weight ratio of 60:40 was used instead of the charge-generating material dispersion (XII).

EXAMPLE 14

An electrophotographic photoreceptor was prepared in the same manner as in Example 12 except that the charge-generating material dispersions B' was singly used instead of the charge-generating material dispersion (XII).

The characteristics of the various electrophotographic photoreceptors obtained in Examples 12 to 14 were measured by means of a photosensitive drum measuring apparatus (Cynthia 91, available from Gentec Inc.) at a temperature of 23° C. and a relative humidity of 50%.

The electrophotographic photoreceptor was charged with −6 kV corona discharge in the dark place. When the surface potential of the electrophotographic photoreceptor was reduced to −600 V, the electrophotographic photoreceptor was then exposed to light having a wavelength of 780 nm and a light power of 22.4 W/m$^2$. The light power was varied with time. The surface potential on the electrophotographic photoreceptor was measured after 0.6 second from the beginning of exposure. The half-decay exposure $E_{1/2}$ (μJ/cm$^2$) was then determined from the relationship between light power and surface potential. Further, the surface potential when the light power is 2 μJ/cm$^2$ is evaluated as residual potential. The results are set forth in Table 4.

TABLE 4

| Example No. | $E_{1/2}$(μJ/cm$^2$) | Residual potential (−V) |
|---|---|---|
| Example 12 | 0.32 | 22 |
| Example 13 | 0.53 | 30 |
| Example 14 | 0.25 | 22 |

The results set forth in Table 4 show that the electrophotographic photoreceptors obtained in Examples 12 to 14 vary about double in half-decay exposure for the same thickness but vary nothing in residual potential. It can thus be appreciated that the electrophotographic photoreceptor of the present invention can be adjusted for photosensitivity within a wide range without having any effect on its residual potential.

The electrophotographic photoreceptors obtained in Examples 12 to 14 were each mounted in a remodelled version of a commercial laser printer equipped with a surface potential meter where they were then evaluated for potential characteristics at a temperature of 23° C. and a relative humidity of 50%. The results of evaluation are set forth in Table 5. The 0% potential, 50% potential and 100% potential in Table 5 indicate the surface potential on the electrophotographic photoreceptor at 0% dot output, 50% dot output and 100% dot output, respectively.

TABLE 5

| Example No. | 0% potential (−V) | 50% potential (−V) | 100% potential (−V) | Residual potential (−V) |
|---|---|---|---|---|
| Example 12 | 690 | 81 | 63 | 23 |
| Example 13 | 705 | 165 | 66 | 24 |
| Example 14 | 677 | 68 | 59 | 23 |

It can be appreciated from the results set forth in Table 5 that the electrophotographic photoreceptor of the present invention shows no variation in 100% potential and residual potential but can vary extremely in 50% potential, making it possible to improve or adjust the reproducibility of gradation in print density.

EXAMPLE 15

(1) 2 parts of the phthalocyanine compound represented by the foregoing general formula (5) obtained in Synthesis Example 1 and 2 parts of a butyral resin (S-Lec BH-3, available from Sekisui Chemical Co., Ltd.) were added to a mixed solvent of 66 parts of methylene chloride and 99 parts of 1,1,2-trichloroethane, and then subjected to dispersion in admixture in a sand mill with glass beads to obtain a charge-generating material dispersion A".

(2) 2 parts of an a type oxytitanium phthalocyanine and 2 parts of a butyral resin (S-Lec BH-3, available from Sekisui Chemical Co., Ltd.) were added to a mixed solvent of 66 parts of methylene chloride and 99 parts of 1,1,2-trichloroethane, and then subjected to dispersion in admixture in a sand mill with glass beads to obtain a charge-generating material dispersion B".

The foregoing charge-generating material dispersions A" and B" were mixed at a weight ratio of 5:95 to obtain a charge-generating material dispersion (I").

The charge-generating material dispersion (I") thus obtained was applied to an aluminum drum having a diameter of 30 mm and a length of 260 mm by a dip coating method to a dry thickness of 0.3 μm, and then dried to form a charge-generating layer.

Subsequently, a solution obtained by dissolving 9 parts of a hydrazone compound represented by the foregoing Compound No. 10 and 10 parts of a polycarbonate resin (Iupilon Z200, available from Mitsubishi Gas Chemical Company, Inc.) in a mixed solvent of 60 parts of methylene chloride and 20 parts of monochlorobenzene was applied to the foregoing charge-generating layer by a dip coating method to a dry thickness of 20 μm, and then dried to form a charge-transporting layer. Thus, an electrophotographic photoreceptor was obtained.

EXAMPLE 16

An electrophotographic photoreceptor was prepared in the same manner as in Example 15 except that a charge-generating material dispersion (III") obtained by mixing the charge-generating material dispersions A" and B" at a weight ratio of 40:60 was used instead of the charge-generating material dispersion (I").

EXAMPLE 17

An electrophotographic photoreceptor was prepared in the same manner as in Example 15 except that a charge-generating material dispersion (V") obtained by mixing the charge-generating material dispersions A" and B" at a weight ratio of 80:20 was used instead of the charge-generating material dispersion (I").

Comparative Example 4

The charge-generating material dispersions B" and D were mixed at a weight ratio of 20:80 to obtain a charge-generating material dispersion (XI").

An electrophotographic photoreceptor was then obtained in the same manner as in Example 15 except that the charge-generating material dispersion (XI") was used instead of the charge-generating material dispersion (I").

Comparative Example 5

An electrophotographic photoreceptor was prepared in the same manner as in Example 15 except that the charge-generating material dispersion B" was singly used instead of the charge-generating material dispersion (I").

The electrophotographic photoreceptors obtained in Examples 15 to 17 and Comparative Examples 4 and 5 were each mounted in a remodelled version of a commercial laser printer equipped with a surface potential meter where they were then evaluated for potential characteristics at a temperature of 23° C. and a relative humidity of ⁻50%. The results of evaluation are set forth in Table 6.

TABLE 6

| Example No. | 0% potential (-V) | 50% potential (-V) | 100% potential (-V) | Residual potential (-V) |
| --- | --- | --- | --- | --- |
| Example 15 | 700 | 147 | 121 | 57 |
| Example 16 | 700 | 210 | 122 | 56 |
| Example 17 | 707 | 342 | 128 | 61 |
| Comparative Example 4 | 685 | 387 | 152 | 112 |
| Comparative Example 5 | 698 | 132 | 118 | 54 |

It can be appreciated from the results set forth in Table 6 that the electrophotographic photoreceptor of the present invention shows no variation in 100% potential and residual potential but can vary extremely in 50% potential, making it possible to improve or adjust the reproducibility of gradation in print density.

Synthesis Example 2

A phthalocyanine compound was prepared in the same manner as in Synthesis Example 1 except that 10.4 parts of 5,5'-dimethyl-2,2'-biphenyldiol were used instead of 9.0 parts of 2,2'-biphenyldiol.

Figure 11:
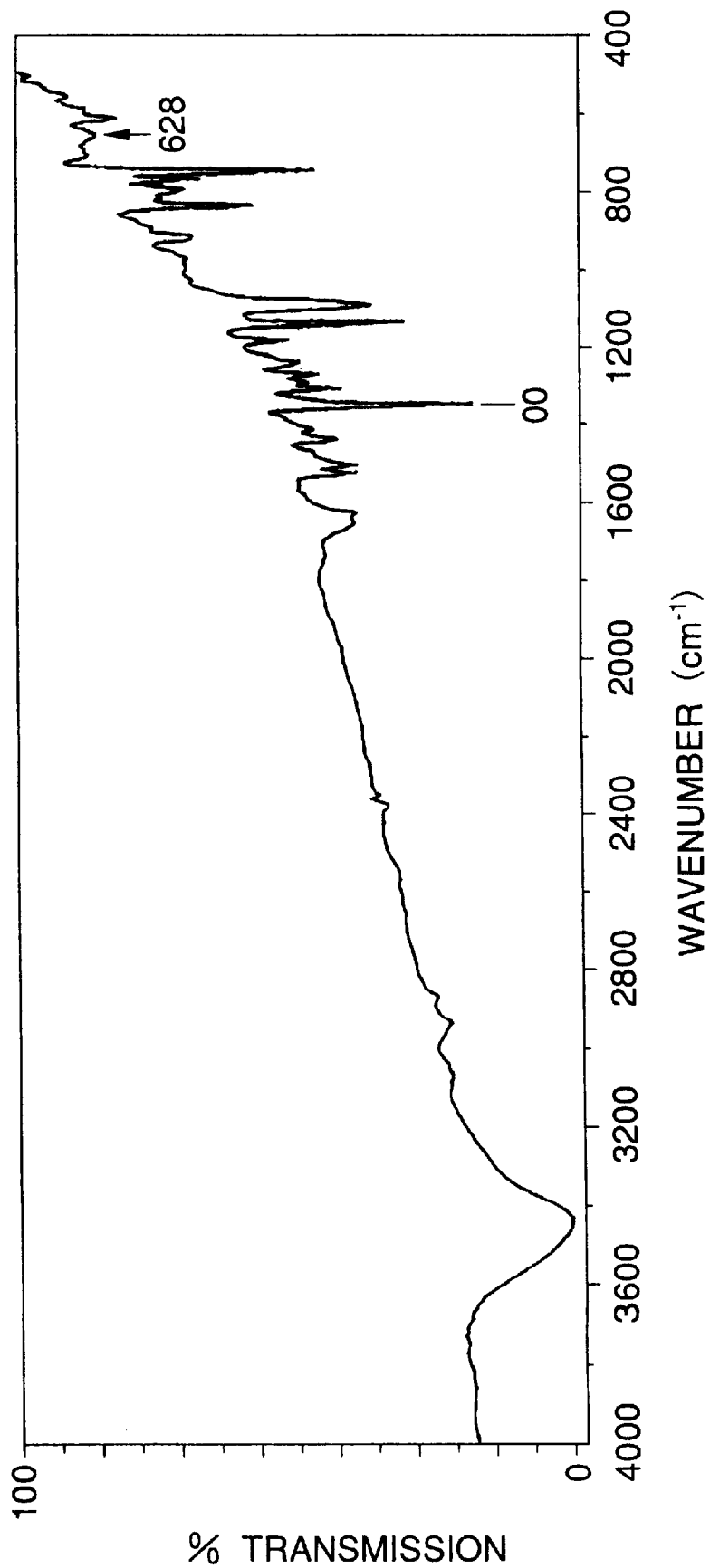
FIG. 11 is a diagram illustrating IR absorption spectrum of a phthalocyanine compound according to the present invention obtained in Synthesis Example 2.

The phthalocyanine compound thus obtained exhibited a peak at m/z =772 in mass spectrum and a spectrum as shown in FIG. 11 in IR absorption and thus was found to be a compound represented by the following general formula (6):

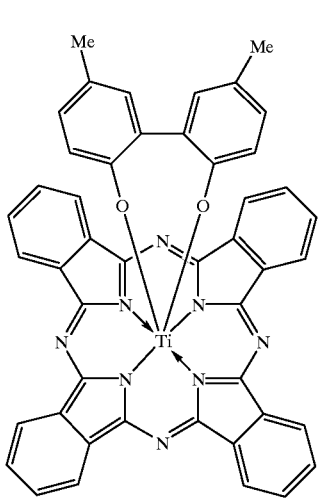

(6)

Figure 12:
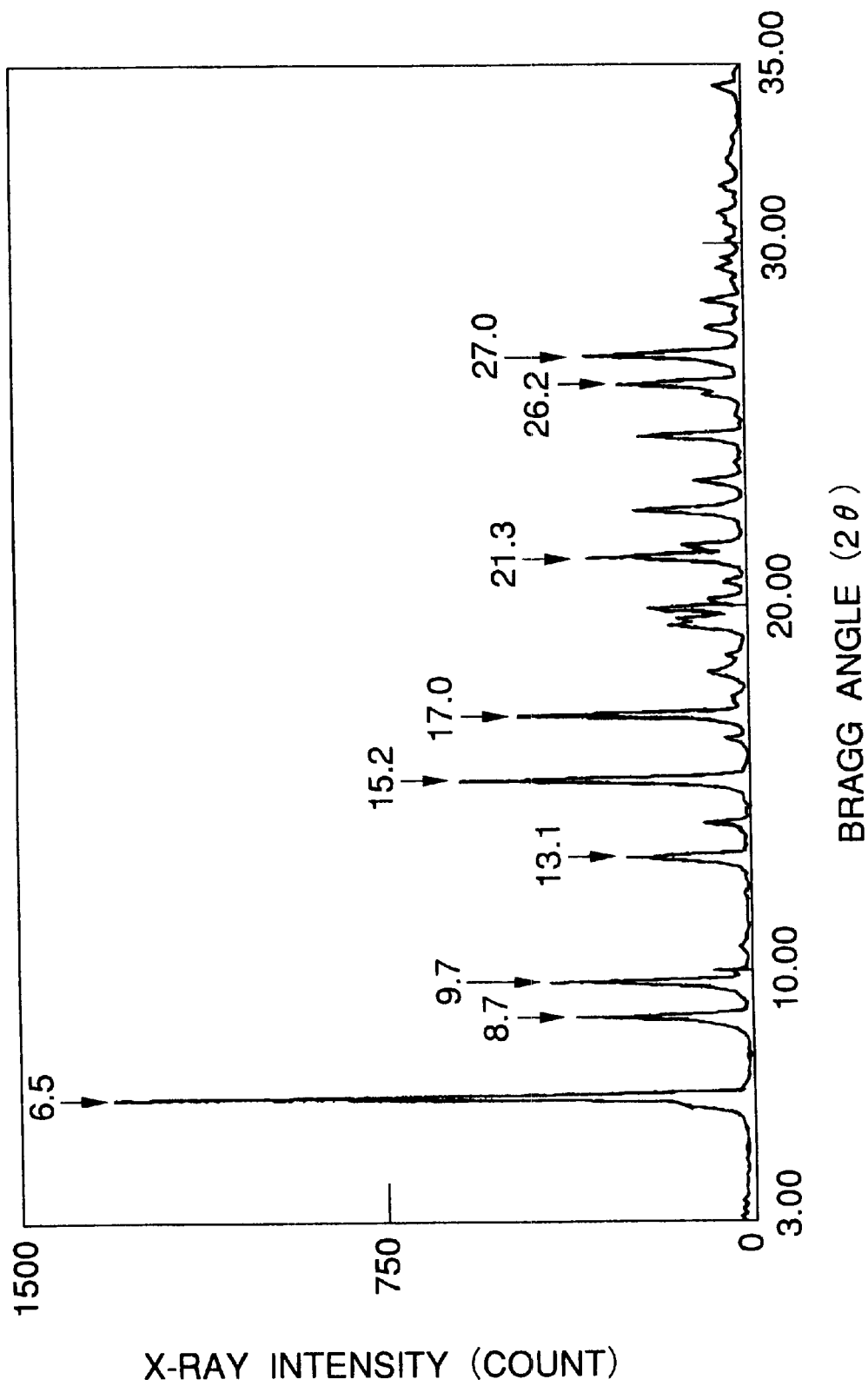
FIG. 12 is a diagram illustrating the powder X-ray diffraction spectrum with Cukα ray of the phthalocyanine compound according to the present invention obtained in Synthesis Example 2.
Figure 13:
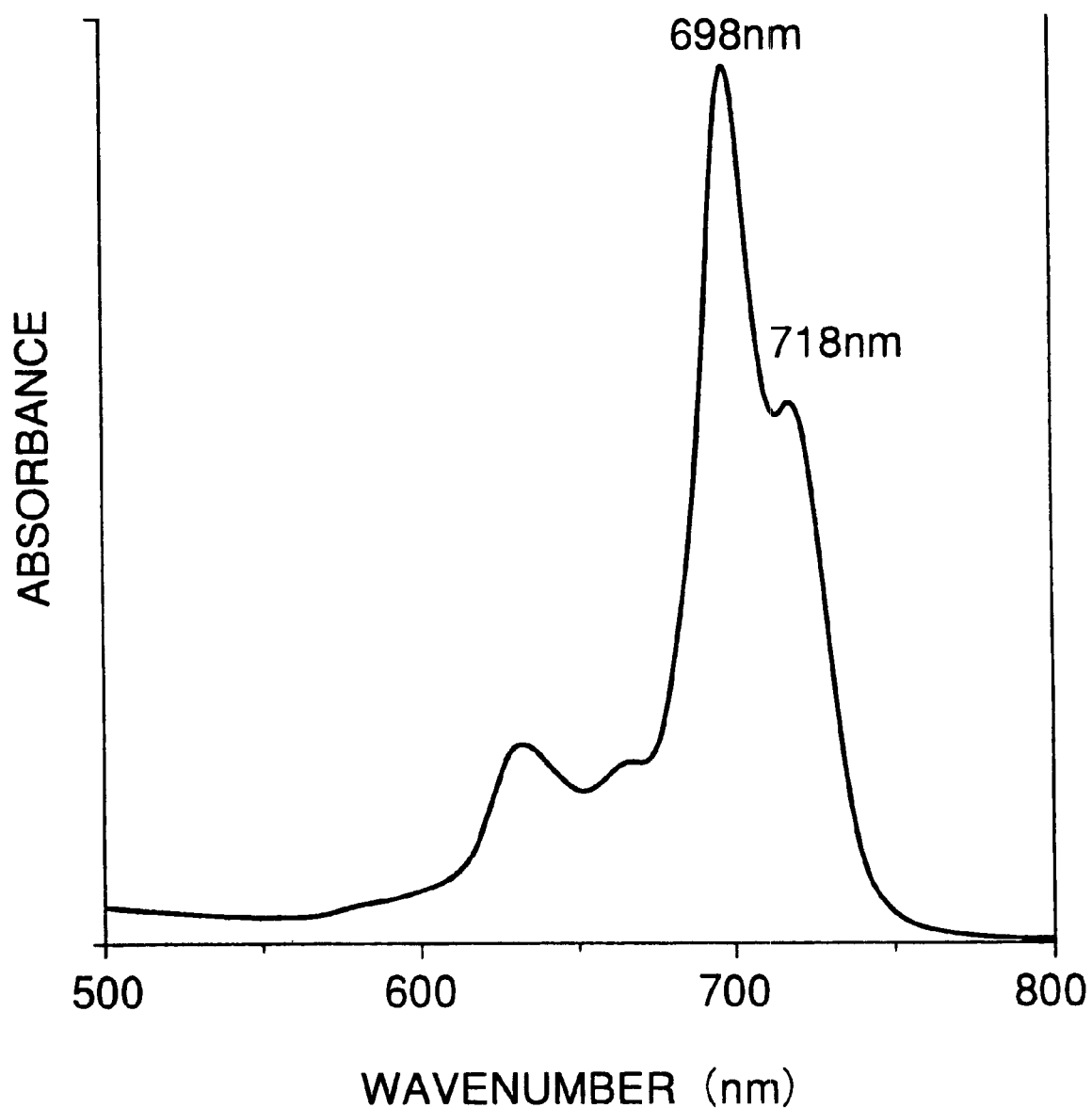
FIG. 13 is a diagram illustrating the light absorption spectrum of an α-chloronaphthalene solution of the phthalocyanine compound according to the present invention obtained in Synthesis Example 2.

The powder X-ray diffraction spectrum of the phthalocyanine compound thus obtained with Cukα ray is shown in FIG. 12. The light absorption spectrum of an α-chloronaphthalene solution of the phthalocyanine compound thus obtained is shown in FIG. 13.

Comparative Synthesis Example 1

Figure 14:
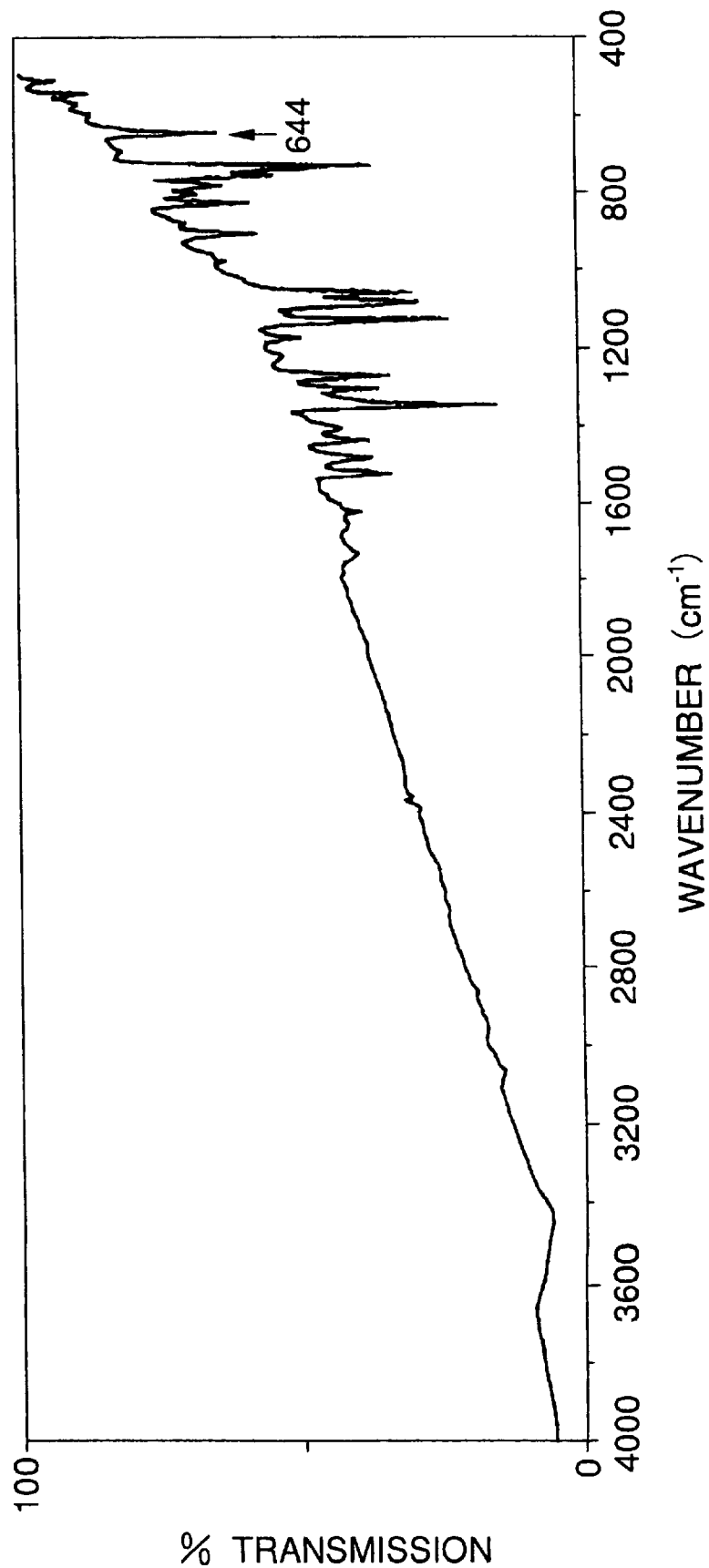
FIG. 14 is a diagram illustrating IR absorption spectrum of a phthalocyanine compound obtained in Comparative Synthesis Example 1.

A phthalocyanine compound represented by the following general formula (7) showing a peak at m/z=668 in mass spectrum and a spectrum as shown in FIG. 14 in IR absorption was prepared in the same manner as in Synthesis Example 1 except that 5.3 parts of catechol were used instead of 9.0 parts of 2,2'-biphenyldiol:

(7)

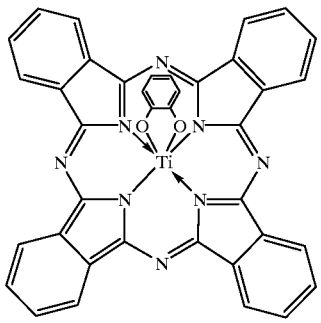

Figure 15:
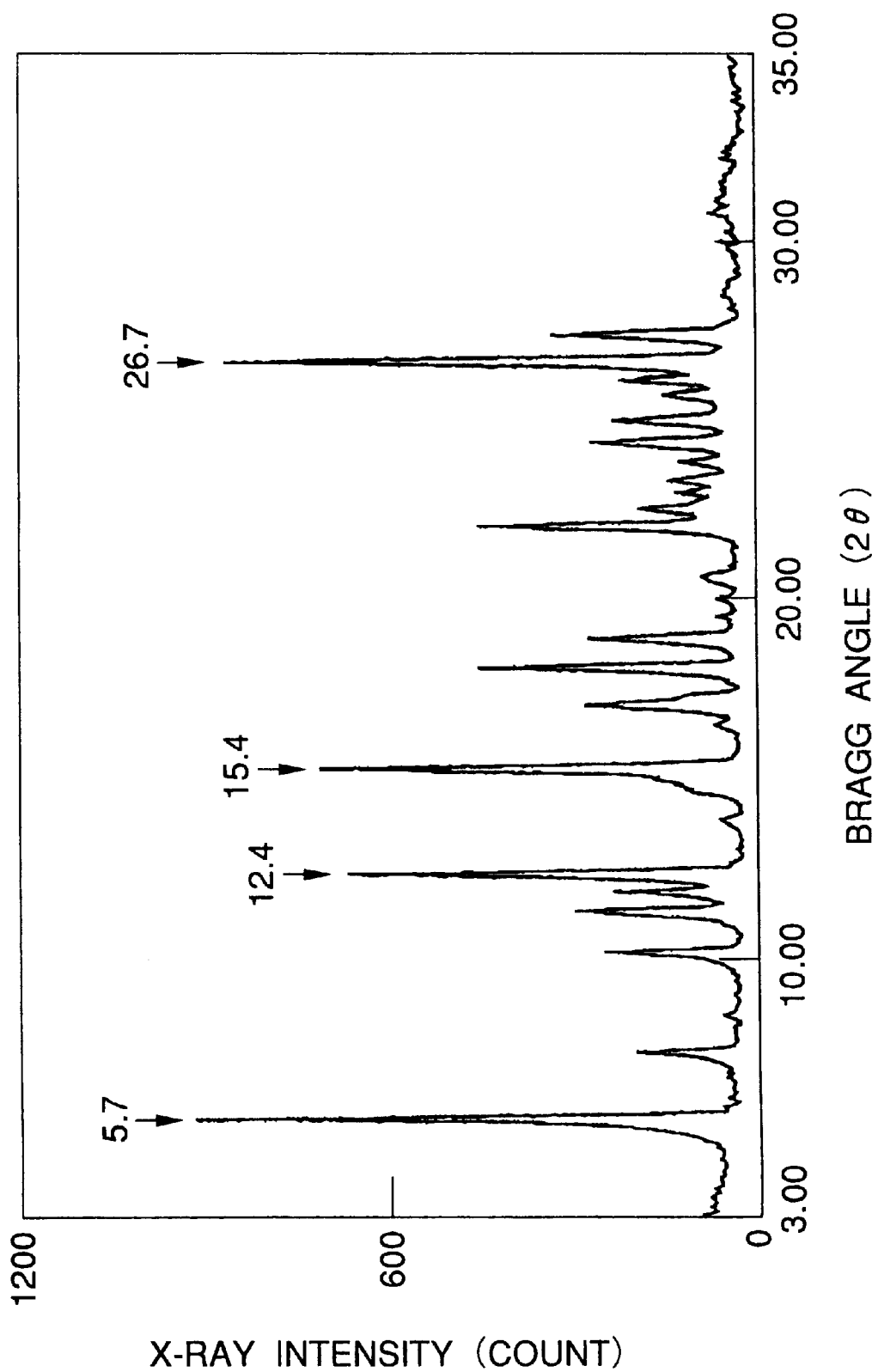
FIG. 15 is a diagram illustrating the powder X-ray diffraction spectrum with Cukα ray of the phthalocyanine compound obtained in Comparative Synthesis Example 1.
Figure 16:
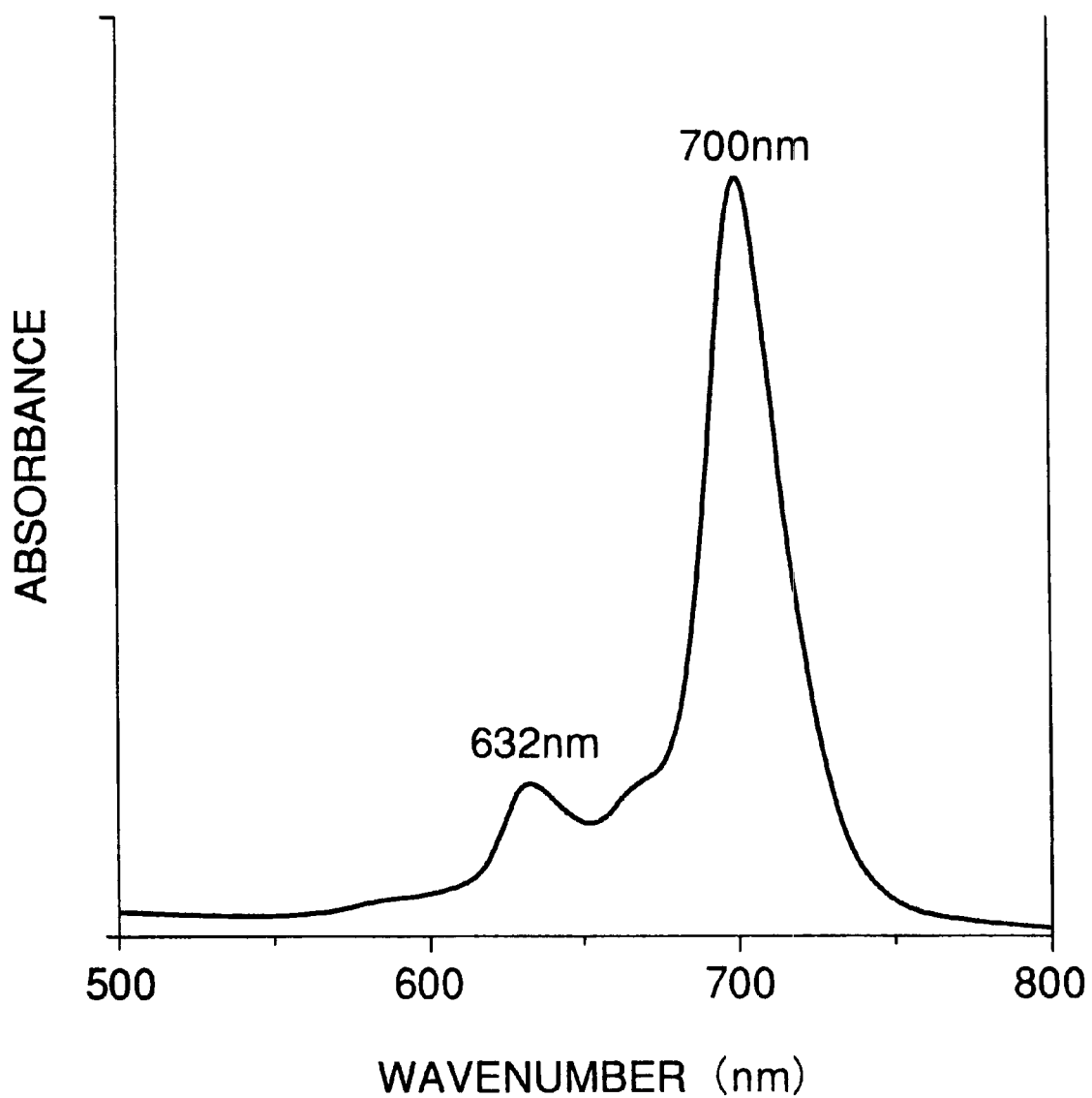
FIG. 16 is a diagram illustrating the light absorption spectrum of an α-chloronaphthalene solution of the phthalocyanine compound according to the present invention obtained in Comparative Synthesis Example 1.

The powder X-ray diffraction spectrum of the phthalocyanine compound thus obtained with CuKα ray is shown in FIG. 15. The light absorption spectrum of an α-chloronaphthalene solution of the phthalocyanine compound thus obtained is shown in FIG. 16.

Comparative Synthesis Example 2

Figure 17:
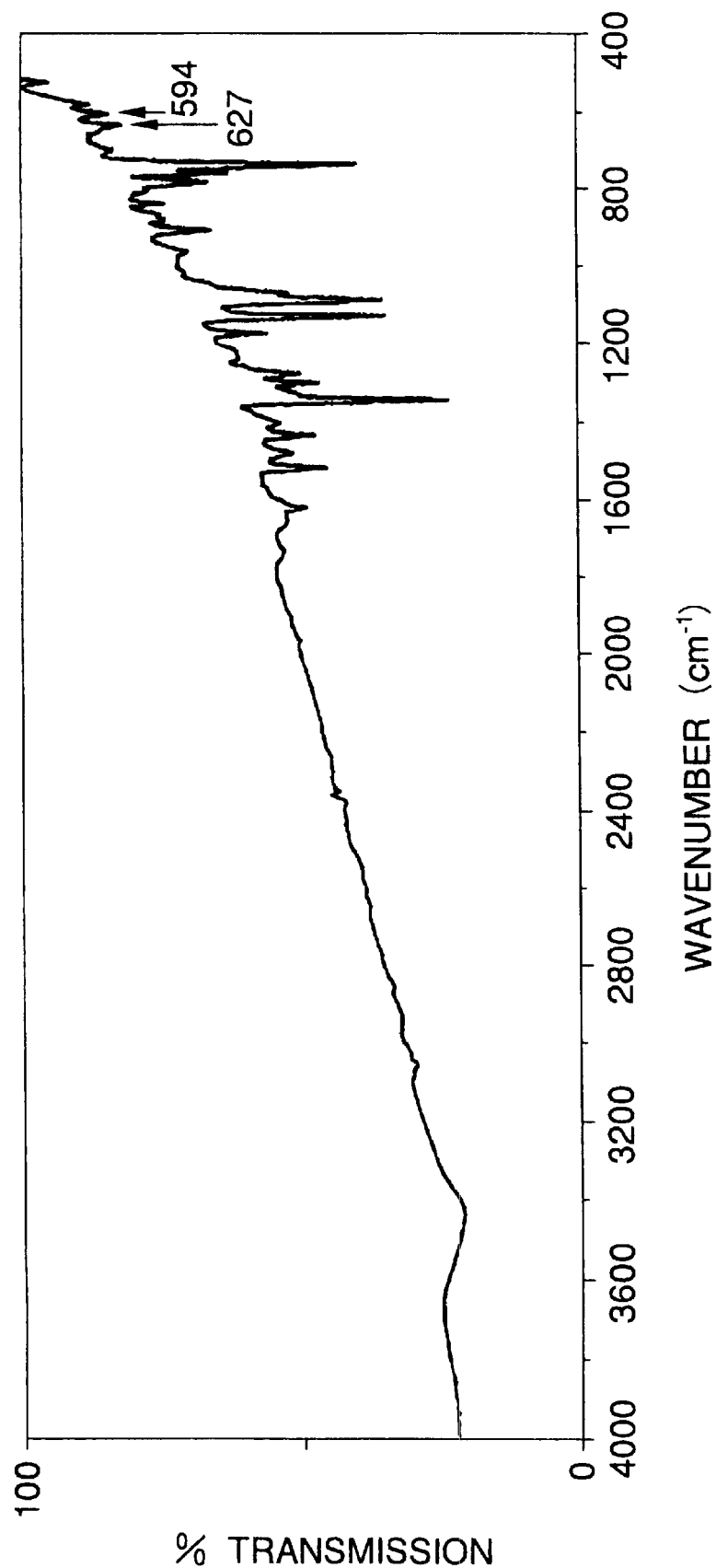
FIG. 17 is a diagram illustrating IR absorption spectrum of a phthalocyanine compound obtained in Comparative Synthesis Example 2.

A phthalocyanine compound represented by the following general formula (8) showing a peak at m/z=682 in mass spectrum and a spectrum as shown in FIG. 17 in IR absorption was prepared in the same manner as in Synthesis Example 1 except that 6.0 parts of 3-methylcatechol were used instead of 9.0 parts of 2,2'-biphenyldiol:

(8)

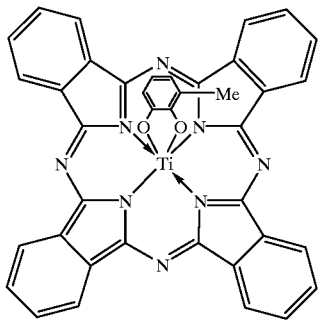

Figure 18:
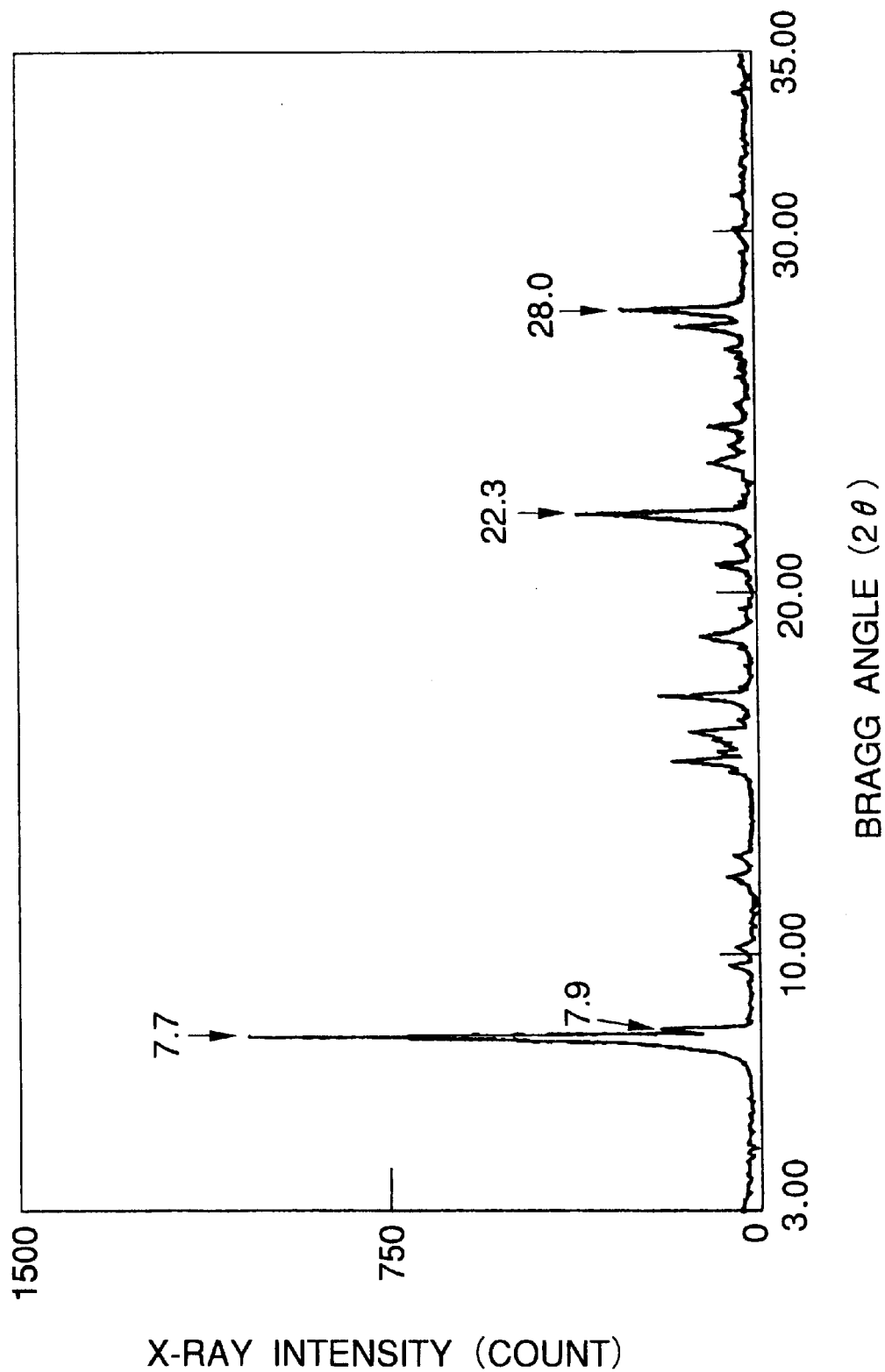
FIG. 18 is a diagram illustrating the powder X-ray diffraction spectrum with Cukα ray of the phthalocyanine compound obtained in Comparative Synthesis Example 2.
Figure 19:
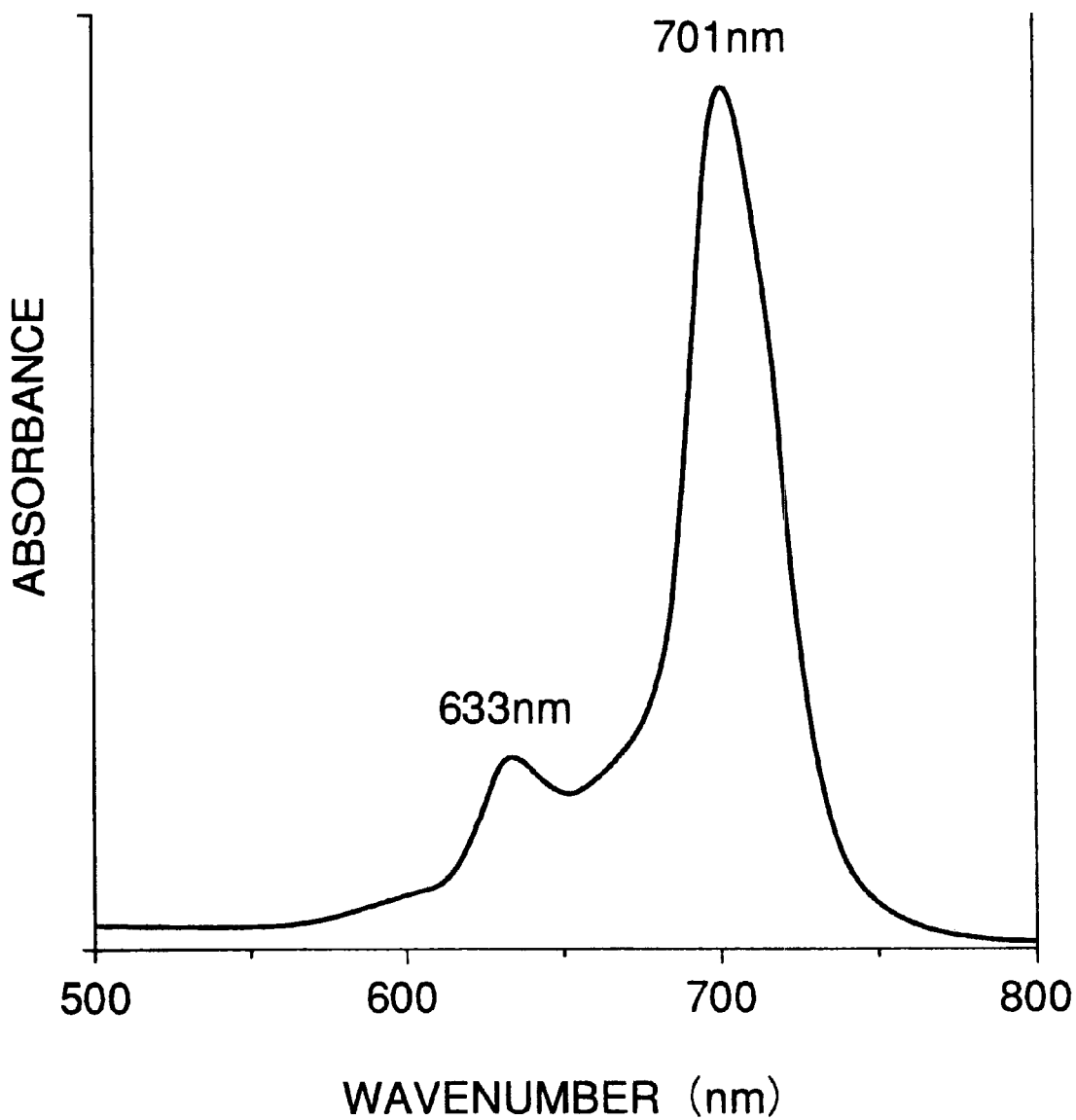
FIG. 19 is a diagram illustrating the light absorption spectrum of an α-chloronaphthalene solution of the phthalocyanine compound according to the present invention obtained in Comparative Synthesis Example 2, wherein the reference numeral 1 indicates an electrically-conductive support, the reference numeral 2 indicates a charge-generating layer, the reference numeral 3 indicates a charge-transporting layer, the reference numerals 4a, 4b and 4c each indicate a photosensitive layer, the reference numeral 5 indicates a charge-generating material, the reference numeral 6 indicates a charge transfer medium, and the reference numeral 7 indicates an electrophotographic photoreceptor.

The powder X-ray diffraction spectrum of the phthalocyanine compound thus obtained with CuKα ray is shown in FIG. 18. The light absorption spectrum of an α-chloronaphthalene solution of the phthalocyanine compound thus obtained is shown in FIG. 19.

EXAMPLE 18

2 parts of the phthalocyanine compound obtained in Synthesis Example 1 and 2 parts of a butyral resin (S-Lec BH-3, available from Sekisui Chemical Co., Ltd.) were added to a mixed solvent of 66 parts of methylene chloride and 99 parts of 1,1,2-trichloroethane, and then subjected to dispersion in admixture in a paint conditioner with glass beads to obtain a charge-generating material dispersion.

The charge-generating material dispersion thus obtained was then applied to a polyester film vacuum-deposited with aluminum by means of a wire bar to form a charge-generating layer having a dry thickness of 0.3 μm. A coating solution obtained by dissolving 20 parts of a charge-transporting material represented by the foregoing Exemplary Compound No. (4) and 20 parts of a polycarbonate resin (Iupilon Z200, available from Mitsubishi Gas Chemical Company, Inc.) in a mixed solvent of 54 parts of methylene chloride and 36 parts of chlorobenzene was applied to the foregoing charge-generating layer to a dry thickness of 15 μm to form a charge-transporting layer. Thus, an electrophotographic photoreceptor having a layer structure shown in FIG. 1 was obtained.

EXAMPLE 19

An electrophotographic photoreceptor was prepared in the same manner as in Example 18 except that the phthalocyanine compound obtained in Synthesis Example 2 was used instead of the phthalocyanine compound obtained in Synthesis Example 1.

Comparative Example 6

An electrophotographic photoreceptor was prepared in the same manner as in Example 18 except that the phthalocyanine compound obtained in Comparative Synthesis Example 1 was used instead of the phthalocyanine compound obtained in Synthesis Example 1.

Comparative Example 7

An electrophotographic photoreceptor was prepared in the same manner as in Example 18 except that the phthalocyanine compound obtained in Comparative Synthesis Example 2 was used instead of the phthalocyanine compound obtained in Synthesis Example 1.

(Evaluation)

The various electrophotographic photoreceptors obtained in Examples 18 and 19 and Comparative Examples 6 and 7 are each charged with −6 kV corona discharge in the dark place, using an electrostatic paper analyzer (SP428, available from Kawaguchi Electric Works, Ltd.). The surface potential of the electrophotographic photoreceptor at this point is defined as $V_0$ (−V). The electrophotographic photoreceptor thus charged is then allowed to stand in the dark place for 10 seconds. The surface potential of the electrophotographic photoreceptor at this point is defined as $V_{10}$ (−V).

The percent surface potential retention $V_{10}/V_0$ (DDR) on the electrophotographic photoreceptor was calculated from $V_0$ and $V_{10}$.

The electrophotographic photoreceptor is then exposed to light having a wavelength of 780 nm and a light power of 1 μW/cm². The time required until the surface potential of the electrophotographic photoreceptor is reduced to the half of $V_{10}$ is then measured to determine the half-decay exposure $E_{1/2}$ (μJ/cm²). The results of the dark and bright decay of surface potential are set forth in Table 7.

TABLE 7

| Example No. | $V_0$ (−V) | $V_{10}$ (−V) | DDR (%) | $E_{1/2}$ (μJ/cm²) |
|---|---|---|---|---|
| Example 18 | 857 | 734 | 86 | 3.53 |
| Example 19 | 902 | 833 | 92 | 6.81 |

TABLE 7-continued

| Example No. | $V_0$ (-V) | $V_{10}$ (-V) | DDR (%) | $E_{1/2}$ ($\mu J/cm^2$) |
|---|---|---|---|---|
| Comparative Example 6 | 226 | 41 | 18 | 10.34 |
| Comparative Example 7 | 305 | 75 | 25 | 8.48 |

Table 7 shows that the phthalocyanine compound according to the present invention is excellent in various characteristics, particularly chargeability and percent charge retention, as compared with the adduct of an aromatic group-neighboring diol having a hydroxyl group in the neighboring position.

The characteristics of the phthalocyanine compound having a specific structure according to the present invention appear remarkably in IR absorption as made clear in the foregoing description. The phthalocyanine compound according to the present invention shows specific absorption peaks at 620 to 650 cm$^{-1}$. It is not yet determined to what atomic bond in the structure of the phthalocyanine compound these peaks are attributed. However, due to the fact that the oxytitanium phthalocyanine compound as a starting material has no characteristic peaks at 620 to 650 cm$^{-1}$ and the peaks in the vicinity of 972 cm$^{-1}$ attributed to Ti=0 characteristic of the oxytitanium phthalocyanine compound as a starting material almost disappear after reaction, these peaks are presumably attributed to the cyclic bisarylato titanium moiety as seen in the phthalocyanine compound according to the present invention.

Other characteristics of the phthalocyanine compound having a specific structure according to the present invention appear remarkably in light absorption spectrum as made clear in the foregoing examples. For example, as shown in the foregoing examples, an aromatic group-neighboring diol such as catechol has absorption peaks in the vicinity of 633 nm and 700 nm in α-chloronaphthalene while the phthalocyanine compound according to the present invention has another specific absorption peak at a longer wavelength, i.e., in the vicinity of 720 nm.

In other words, the specific phthalocyanine compound of the present invention such as obtained in the foregoing examples exerts a technical effect of showing a new absorption in a longer wavelength range and thus enabling the resulting electrophotographic photoreceptor to cope with near infrared ray more thoroughly.

It is not yet determined to what structural factor in the phthalocyanine compound this absorption peak is attributed. However, this absorption peak is presumably attributed to the fact that the conjugated action of the cyclic bisarylato titanium moiety in the phthalocyanine compound according to the present invention has some effect on the electron state of the molecule of the phthalocyanine compound.

The electrophotographic photoreceptor of the present invention comprises a phthalocyanine compound having a specific structure and a titanium phthalocyanine compound incorporated in a charge-generating layer at various ratios. In this arrangement, the photosensitivity of the electrophotographic photoreceptor can be adjusted within a range wider than conventional. Thus, the resulting electrophotographic photoreceptor is advantageous in that it can meet the demand which will be growing more and more. Further, the charge-generating material dispersion for forming the charge-generating layer in the electrophotographic photoreceptor comprising a phthalocyanine compound having a specific structure and a titanium phthalocyanine compound incorporated therein at a ratio of from 5:95 to 80:20 by mass exhibits an excellent coating stability and thus has a great advantage in its production. Moreover, the phthalocyanine compound of the present invention has a novel structure and thus can be used as a coloring material having a new color tone or in an organic solar cell. It can also be preferably used in electronic data materials such as the foregoing electrophotographic photoreceptor.

While the invention has been described in detail and with reference to specific embodiments thereof, it will be apparent to one skilled in the art that various changes and modifications can be made therein without departing from the spirit and scope thereof.

What is claimed is:

1. A phthalocyanine compound, represented by the following general formula (1):

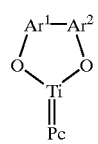

(1)

wherein Ar$^1$ and Ar$^2$ each independently represent an orthophenylene group which may have a substituent; and Pc represents an unsubstituted or substituted phthalocyanine residue.

2. The phthalocyanine compound according to claim 1, which is one represented by the general formula (1) wherein Ar$^1$ and Ar$^2$ each represent an orthophenylene group.

3. The phthalocyanine compound according to claim 1, wherein said phthalocyanine compound represented by the general formula (1) is a phthalocyanine compound in the form of a crystal wherein Ar$^1$ and Ar$^2$ each represent an orthophenylene group and X-ray diffraction spectrum with respect to Cukα shows peaks at least at Bragg angle (2θ±0.2°) of 7.7° and 8.0°.

4. A phthalocyanine compound, which is a product of the reaction of a bis(hydroxyaryl) compound represented by the following general formula (2) with an oxytitanium phthalocyanine compound:

HO—Ar$^1$—Ar$^2$—OH     (2)

wherein Ar$^1$ and Ar$^2$ each independently represent an orthophenylene group which may have a substituent.

5. The phthalocyanine compound according to claim 4, wherein said bis(hydroxyaryl) compound represented by the general formula (2) is 2,2'-biphenyldiol which may have a substituent.

* * * * *